Figure 1:
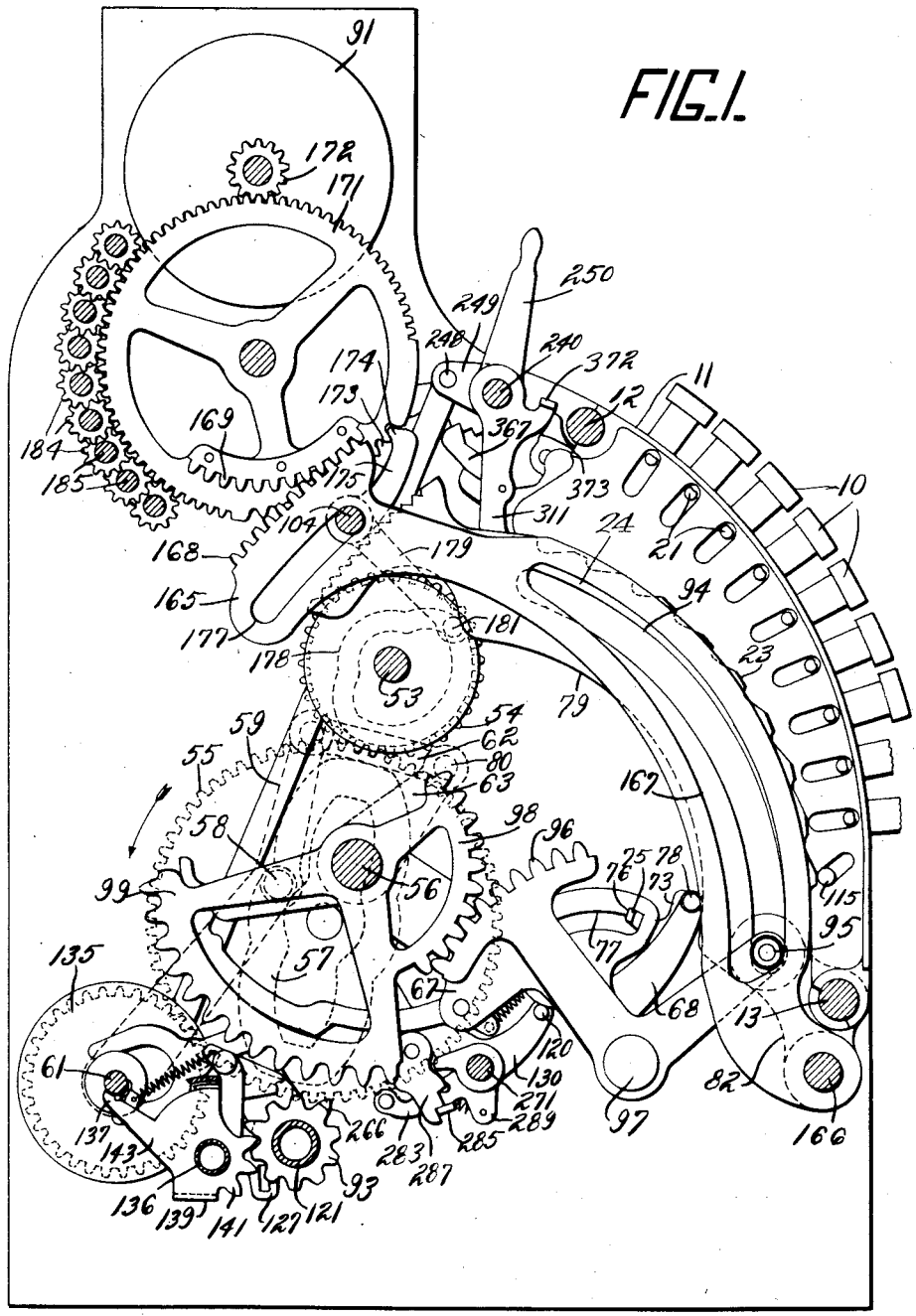

F. L. FULLER.
DIFFERENTIAL MECHANISM FOR ACCOUNTING MACHINES.
APPLICATION FILED OCT. 1, 1913.

1,195,198.

Patented Aug. 22, 1916.
8 SHEETS—SHEET 1.

Witnesses
Harry W. Lindsey Jr.
H. F. Sadgebury

Inventor
Frederick L. Fuller
by R. Chilson
Chester H. Braselton
Attorneys

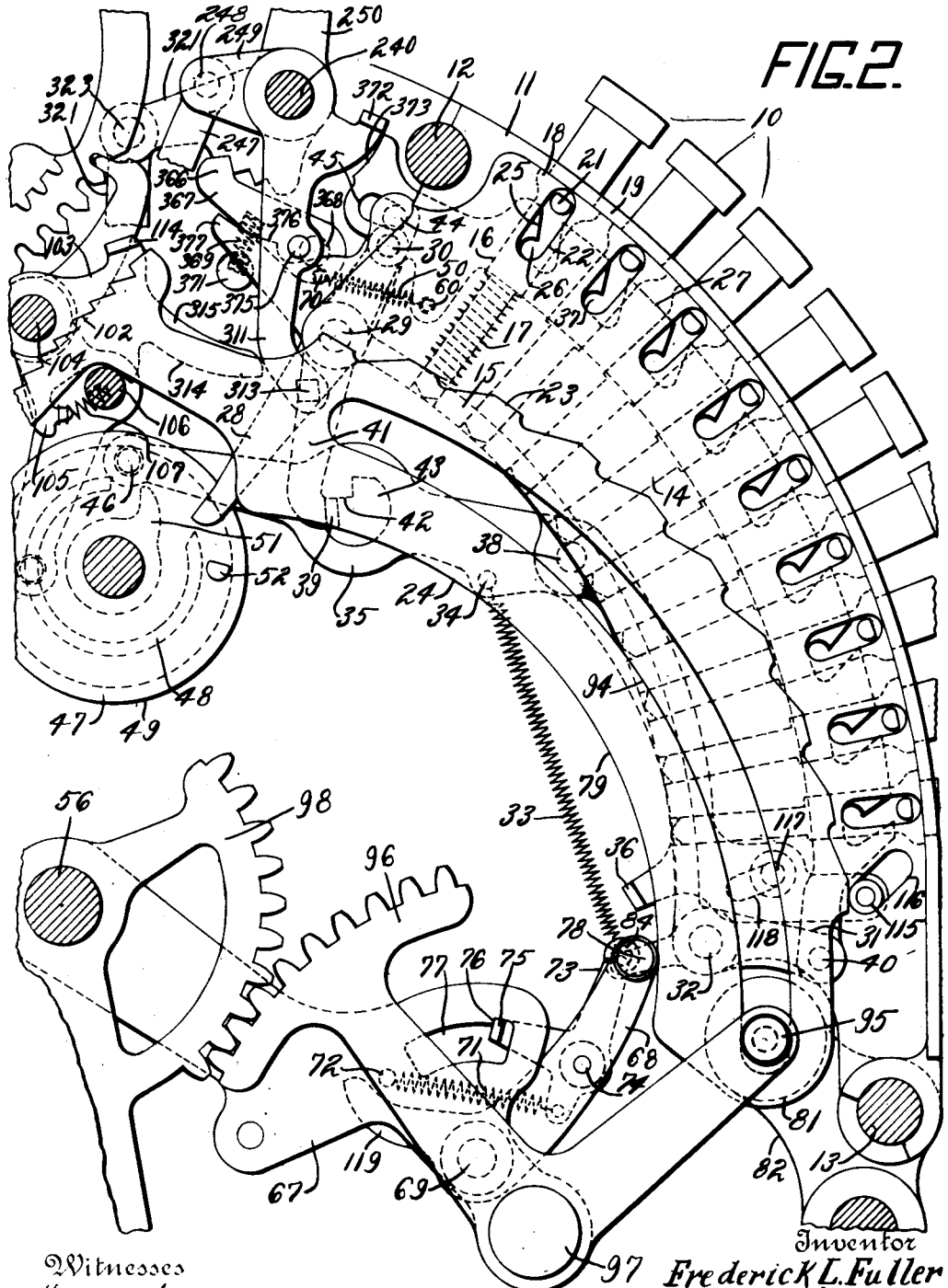

F. L. FULLER.
DIFFERENTIAL MECHANISM FOR ACCOUNTING MACHINES.
APPLICATION FILED OCT. 1, 1913.
1,195,198.
Patented Aug. 22, 1916.
8 SHEETS—SHEET 3.
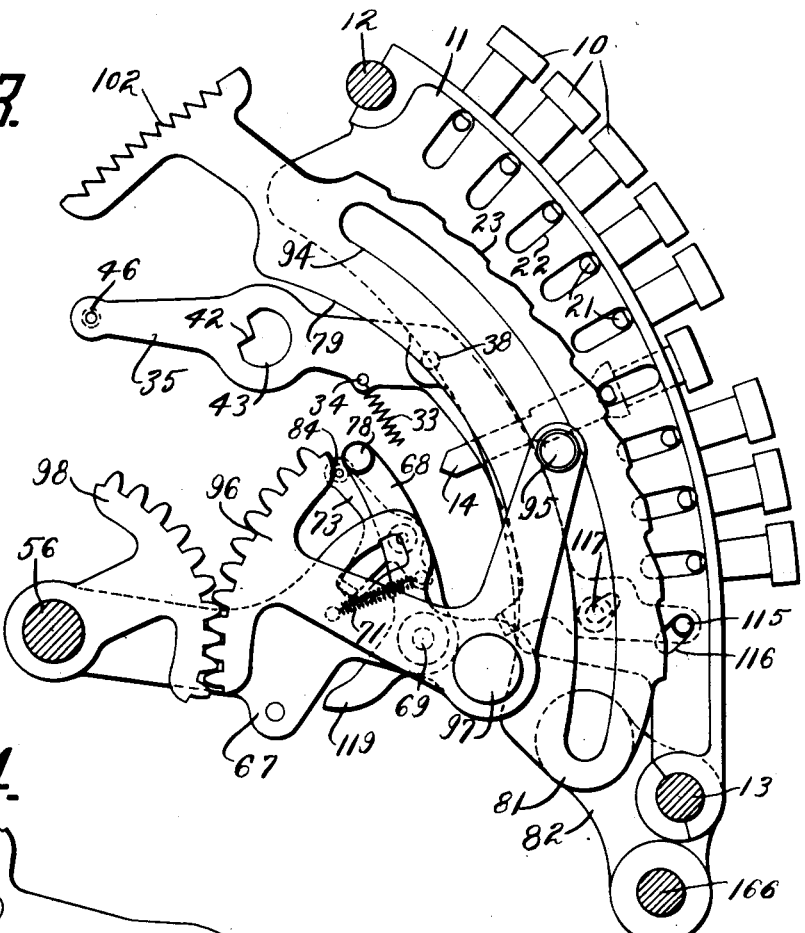
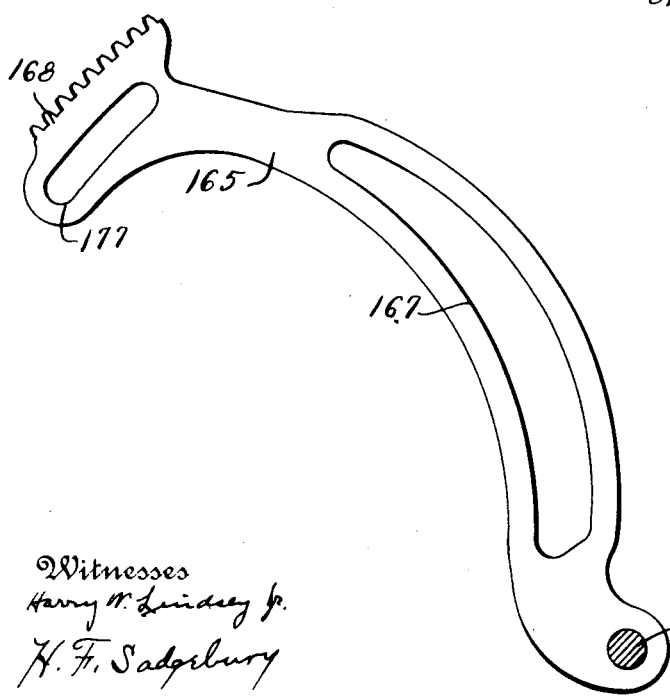
Witnesses
Harry N. Lindsey Jr.
H. F. Sadgebury
Inventor
Frederick L. Fuller
by R. Adams
Chester N. Braselton
Attorneys

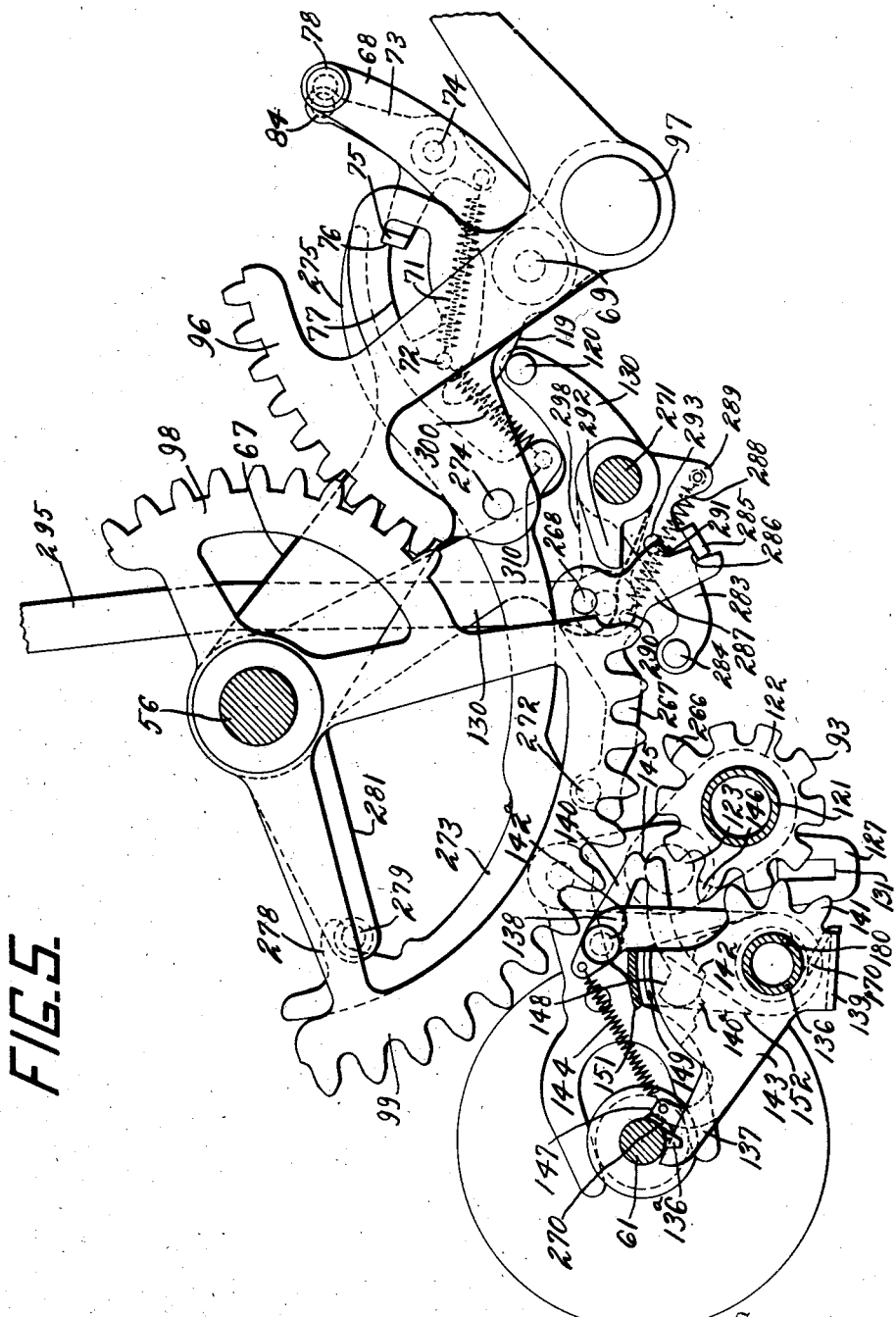

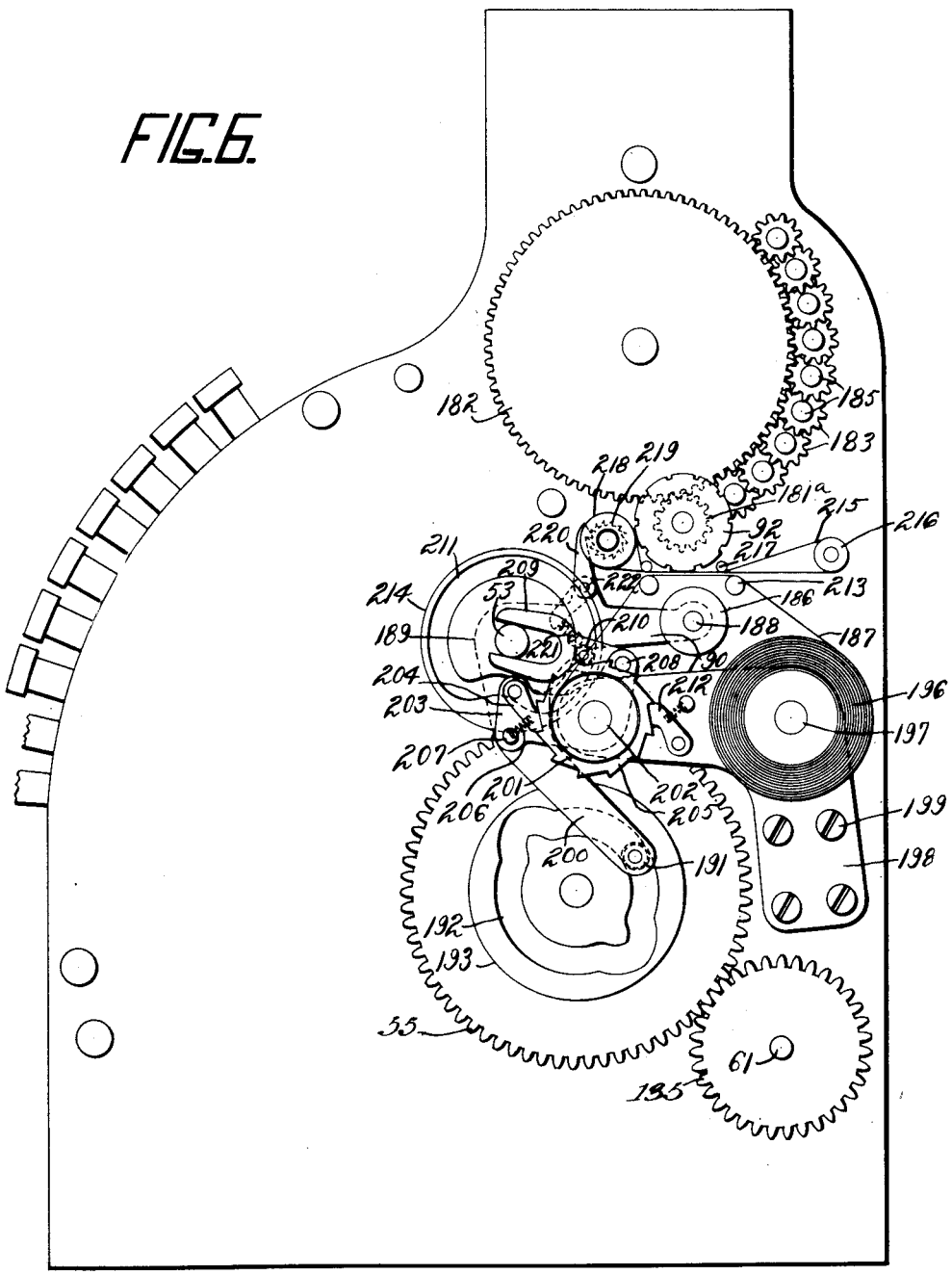

F. L. FULLER.
DIFFERENTIAL MECHANISM FOR ACCOUNTING MACHINES.
APPLICATION FILED OCT. 1, 1913.
1,195,198.
Patented Aug. 22, 1916.
8 SHEETS—SHEET 6.
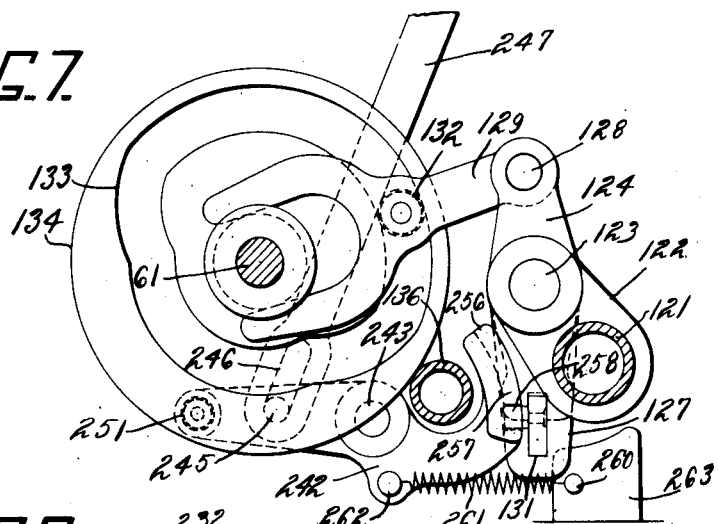
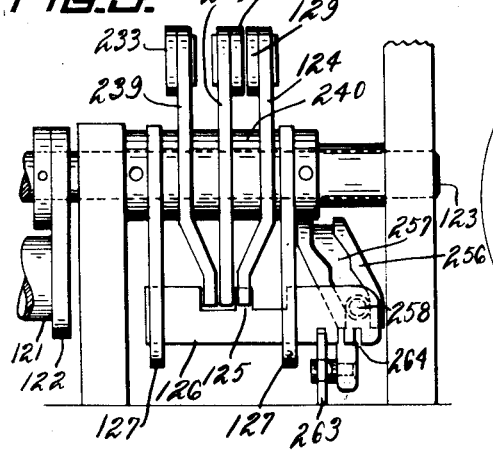
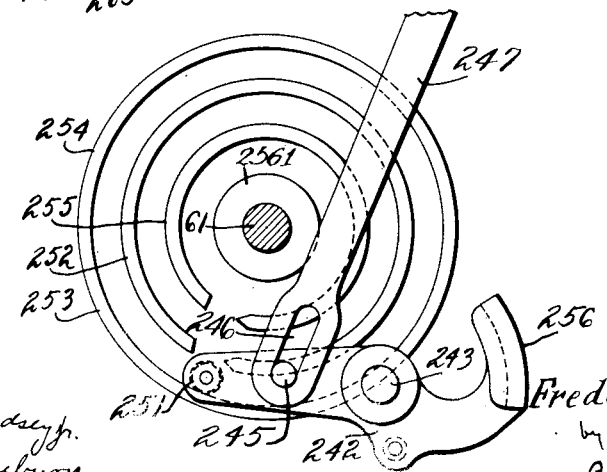
Witnesses
Harry W. Lindsey Jr.
H. F. Sadgebury
Inventor
Frederick L. Fuller
by
Chester H. Brandon
Attorneys F. L. FULLER.
DIFFERENTIAL MECHANISM FOR ACCOUNTING MACHINES.
APPLICATION FILED OCT. 1, 1913.

1,195,198.

Patented Aug. 22, 1916.
8 SHEETS—SHEET 7.

Witnesses
Harry N. Lindsey Jr.
H. F. Sadgebury

Inventor
Frederic L. Fuller
by R. C. Blair
Chester H. Braselton
Attorneys

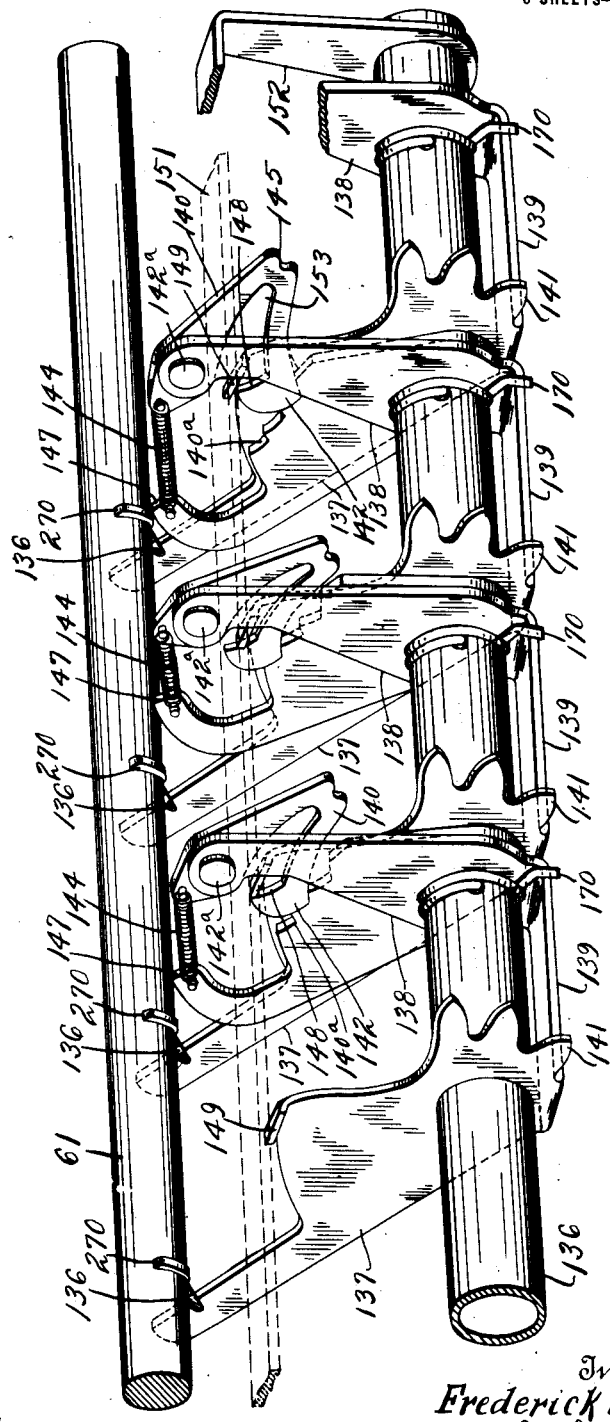

UNITED STATES PATENT OFFICE.

FREDERICK L. FULLER, OF DAYTON, OHIO, ASSIGNOR TO THE NATIONAL CASH REGISTER COMPANY, OF DAYTON, OHIO, A CORPORATION OF OHIO, (INCORPORATED IN 1906.)

DIFFERENTIAL MECHANISM FOR ACCOUNTING-MACHINES.

1,195,198.            Specification of Letters Patent.      Patented Aug. 22, 1916.

Application filed October 1, 1913. Serial No. 792,869.

*To all whom it may concern:*

Be it known that I, FREDERICK L. FULLER, a citizen of the United States, residing at Dayton, in the county of Montgomery and State of Ohio, have invented certain new and useful Improvements in Differential Mechanism for Accounting-Machines, of which I declare the following to be a full, clear, and exact description.

This invention relates to accounting machines and more particularly to the differential mechanism thereof.

One of the principal objects of this invention is to obtain a better form of key controlled differential mechanism, which subjects the machine to less jars than the known forms and the operation of which is much smoother in action. To this end the mechanism shown in the illustrative form disclosed herein is constructed to rotate an accounting device and the actuators therefor during a predetermined period regardless of the extent of rotation and to regulate the speed of such rotation as desired. The mechanism employed includes an actuating rack integral with a segment gear. A second segment gear is pivoted on the outer end of an oscillatory driving arm pivoted concentric with the first segment gear and constantly in mesh with the first segment gear. The second segment gear has an arm projecting from its pivotal center and the arm is equipped with a roller engaging in the slot in a pivoted determining member, the slot being eccentric with the pivot of the arm carrying the segment gear. The driving arm carries a latch provided with a roller for engaging an edge of the slotted determining member to position differentially the determining member as the arm is given an invariable extent of movement in a counter-clockwise direction. When the latch is tripped by a depressed amount key and before the actuating rack has received its complete differential movement the slotted determining member is locked in its adjusted position so that continued movement of the arm causes the segment gear pivoted thereon to rotate about its pivotal center. The slot in the determining member is so shaped that the entire counter-clockwise movement of the driving arm through the intermeshing segment gears carries the actuating rack integral with the one segment with it to impart to the actuating rack its full differential movement. The segment pivoted on the outer end of the driving arm is also given a rotary movement which is much greater after the latch is tripped by a key than before as the slotted determining member is locked from movement after the latch has been tripped. This rotary movement of the segment varies in extent, speed and direction dependent upon the amount entered in the accounting device, and as the movement of the oscillatory arm is uniform the rotary movement makes it possible to utilize the entire movement of the oscillatory arm to impart differential movement to the actuating rack and also to regulate the speed of the movement of the actuating rack as desired by merely changing the form of the slot in the determining member. While the oscillatory driving arm is being restored to normal position the determining member remains locked in its adjusted position and the accounting device is thrown into engagement with the actuating rack so that the accounting device is differentially rotated by the return movement of the rack. The acceleration of the return movement of the rack with the driving arm is not the same as it was in its forward movement but the entire return movement of the oscillatory driving arm is nevertheless utilized to restore the rack.

A further object of the invention is to provide an improved construction of indicator and printing type setting mechanism and connections for setting the indicators and printing type either as controlled from manipulative devices in entering items or from the accounting device elements to indicate and print amounts standing on the accounting device. To effect this object in the preferred form shown herein a slotted arm is pivoted eccentrically to the slotted determining member and carries a rack portion engaging with an actuating gear for an indicator and this actuating gear is also geared to a printing wheel. The roller on the segment carried by the oscillatory driving arm passes through the slots in both the determining member and this slotted arm so that when the driving arm is raised and the segment gear rotated, as mentioned above the roller will engage either side of the slot in the arm meshing with the indicator actuating gear and move it differentially and directly from one position to another to rotate differentially the actuating gear and thereby position the indicator and the printing wheels.

It is also an object of this invention to provide an improved control for the accounting device through which the latter may control the printing and indicating mechanisms to indicate and print the amount on the accounting device and leave the accounting device at zero or return it to original position as desired. In the preferred form illustrated in the drawings, this is accomplished by engaging the actuating racks with the accounting device on their forward movement, disengaging them at the end of such movement if the accounting device is to be left at zero, and maintaining their engagement if the accounting device is to be returned to its original position. A special lever is provided for controlling these operations and the operation of the lever also serves to prevent the locking of the slotted determining member during the forward stroke of the driving arm as the entire forward stroke of the oscillatory driving arm is not always utilized to return the accounting device to zero position because no key is depressed. It is therefore necessary to permit the slotted determining arm to return to the position to which it is adjusted when the actuating rack has imparted to it the same extent of movement in an adding operation. The slotted determining member is driven forward by the oscillatory driving arm until the corresponding accounting element upon reaching zero position operates a device which trips the latch on the arm so that continued movement of the arm through the rotary movement of the segment gear pivoted thereon returns the determining member to its proper position. In this way all of the determining members are moved in turn to zero operations proportionally to the extents of movement of their corresponding accounting elements in adding operations.

With these and incidental objects in view, the invention consists in certain novel features of construction and combinations of parts the essential elements of which are set forth in appended claims, and a preferred form of embodiment of which is hereinafter described with reference to the drawings which accompany and form part of this specification.

Figure 11:
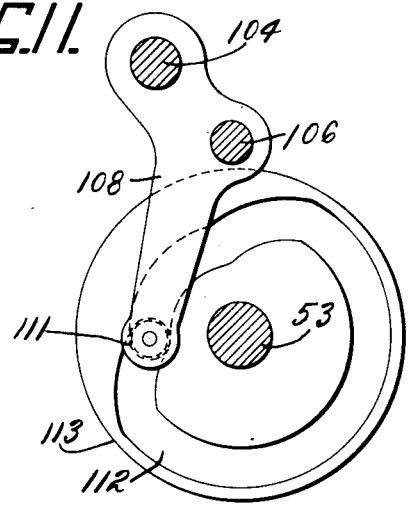
Figure 14:
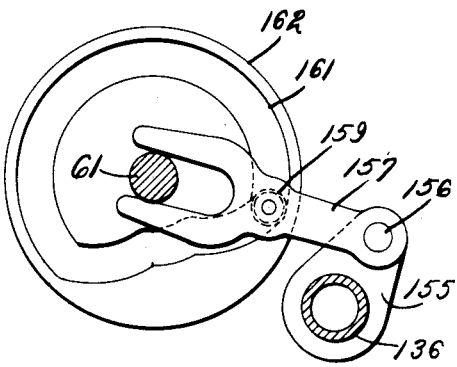
Figure 12:
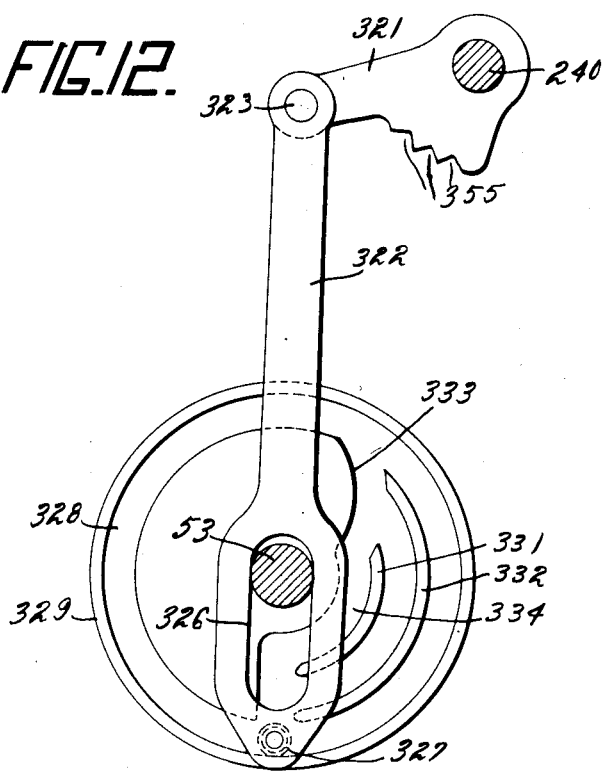
Figure 13:
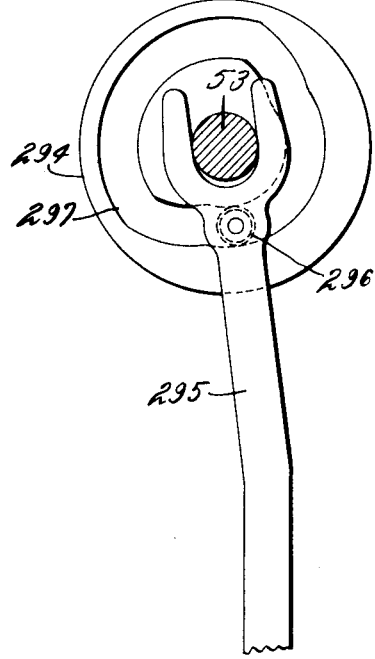

Of said drawings:—Figure 1 is a transverse vertical section of a cash register having the present invention applied thereto. Fig. 2 is a detail in side elevation of one section of the differential mechanism and the keyboard. Fig. 3 is a detail in side elevation of the differential mechanism as it appears after being tripped by contact with a depressed "four" key. Fig. 4 is a detail in side elevation of an indicator setting segment. Fig. 5 is a detail in side elevation of the totalizer and the differential mechanism for driving the same. Fig. 6 is a right hand side elevation of the machine showing the printing mechanism. Fig. 7 is a detail of a cam and connections employed to rock the totalizer into and out of engagement with its actuating members during an adding operation of the machine and also shows the means for selecting the proper cam for throwing the totalizer into engagement with its actuating members. Fig. 8 is a detail of cams and connections employed to rock the totalizer into and out of engagement with its actuating members during "reset" and "read" operations of the machine. Fig. 9 is an end view of the cam selecting means shown in Fig. 7. Fig. 10 is a detail of the device employed to lock the cam selecting means in its adjusted position during an operation of the machine. Fig. 11 is a detail of a cam and an arm employed to operate alining devices for the differential mechanism. Fig. 12 is a detail of a cam and pitman employed to lock the "read" and "reset" lever in its set position and to restore the lever to normal position at the proper time. Fig. 13 is a detail of the cam and pitman for operating alining devices for the totalizer. Fig. 14 is a detail of a cam and connections for operating the transfer mechanism. Fig. 15 is a detail perspective view of the transfer mechanism.

The purpose of the mechanism of this machine is mainly differentially to set accounting devices according to items and totals of items. The present invention is chiefly differentiated from other accounting devices, in that determining devices in it are differentially positioned by connections to the main drive shaft as controlled by manipulative devices while the actuating members for the accounting devices are simultaneously driven differentially as desired. Setting members operated from the main drive shaft are guided by the determining members and drive the totalizer, indicators, and type carriers.

A novel transfer mechanism for the totalizer is shown and described herein, but this feature of the invention is not claimed herein as it is claimed in a co-pending application of the present applicant, filed January 23, 1914, Serial No. 813,881.

*Keyboard.*—The keyboard consists of a plurality of banks of keys 10, and one of these banks is shown in Fig. 2. The keys are slidably mounted in supporting frames 11 which in turn are supported in proper position in the machine by tie bars 12 and 13. Encircling the shanks 14 of the keys and located between flanges 15 of the supporting frame 11 and the shoulders 16 of the keys are key springs 17. The springs normally retain the keys in undepressed positions as shown in Fig. 2 and their action is limited by shoulders 18 on the keys engaging flanges 19 on the frames 11. Each key is provided with a laterally extending pin 21 passing through an opening 22 in the supporting frame and across the forward edge 23 of a determining member 24 for the same bank. These pins are positioned to engage inclined edges 25 of notches 26 in a key detent 27. The latter is connected at its upper end by a pin 30 to a lever 28 pivoted by a pin 29 to the keyframe and the lower end is supported by a lever 31 pivoted at 32 also to the key frame, the detent being pivoted to the lever by a pin 40. The inner end of the latter lever 31 has a spring 33 attached thereto and the other end of the spring is connected to a pin 34 on a lever 35 pivoted at 38 to the key frame 11 and carrying a zero trip 36. The spring 33 normally holds the levers 28 and 31 and the detent plate 27 in the position shown in Fig. 2, but when a key is depressed the detent is raised against the action of the spring 33 until the pin 21 on the key depressed enters a set-off 37 in the lower end of the upper side of the notch 26 when the detent is permitted to be returned slightly by the spring 33 so that the key through the engagement of the pin with the set-off is held in depressed position.

In addition to the usual amount keys the zero trip 36 carried by the lever 35 is provided in each bank, as with the particular differential mechanism employed herein it is necessary to prevent the driving mechanism from imparting a movement to the actuating rack when no amount key in the corresponding bank is depressed. The lever 35 is normally held in the operative position shown in Fig. 2 by engagement of a lug 39 on the lower end of a lever 41 with a shoulder 42 formed in a nearly circular opening 43 in the upper end of the lever 35. The lever 41 which is pivoted at 29 is moved upon depression of a key as the upper end of the lever carries a roller 44 normally in engagement with the forward end of a slot 45 in the detent plate 27 so that when the detent is raised by the depression of a key the lever is rocked counter-clockwise and the lug 39 is carried out of engagement with the shoulder 42 formed in the opening 43. The lever 35 is then allowed to be rocked counter-clockwise by the spring 33 to carry the zero trip 36 out of operative position and the detent is permitted by the slot 45 to be returned slightly when the pin 21 on the key passes into engagement with the set-off 37 in the notch 26.

The zero lever 35 is locked in its operative or inoperative position during movement of the driving mechanism to prevent its displacement. To this end the rear end of the lever carries an anti-friction roller 46 which, when no key in a bank is depressed, plays in a groove formed by concentric ribs 47 and 48 in the face of a disk 49 and when the zero trip is carried out of operative position by depression of a key the roller, upon operation of the machine, plays in the groove formed by the rib 48 and a cam portion 51 also in the face of the disk. As shown in Fig. 2 the cam portion 51 is so shaped as to restore the zero lever to normal position near the end of a complete rotation of the disk 49 in order to carry the zero trip back to operative position.

For the purpose of releasing depressed keys at the end of the operation of the machine the disk 49 carries a stud 52 in position to engage the lower end of the lever 28 as the disk 49 completes its rotation. When the pin 52 engages the lever 28 the lever is rocked counter-clockwise (Fig. 2) thus lifting the detent plate 27 to disengage the set-off 37 in the notch 26 from the pin 21 on the depressed key. The latter then moves to its undepressed position under the action of its spring 17 and the lever 41 is restored to normal position by a spring 50 connected to the detent 27 by a pin 60 and to the lever 41 by a pin 70.

*Differential mechanism.*—Referring to Fig. 1, 53 indicates the main drive shaft and the devices operated thereby are designed to be operated during one rotation of the drive shaft at each operation of the machine. A motor or other driving means for the shaft is omitted from the drawings. The shaft carries rigid thereon and at its right hand end a gear wheel 54 meshing with a gear wheel 55 (Figs. 1 and 6) loose on a stud projecting from the frame of the machine. This latter wheel is provided with twice as many teeth as the gear wheel 54 so that one rotation of the shaft 53 causes one-half rotation of the gear wheel 55. The gear wheel 55 has a cam groove 57 (Fig. 1) formed in its face and is engaged by a roller 58 mounted centrally on an arm 59 pivotally mounted on a shaft 61. The upper end of the arm has a link 62 pivoted thereto, the forward end of the link being pivoted by a pin 80 to the upper end of an arm 63 fast on a shaft 56. The shape of this cam groove is such that rotation of the gear 55 in the direction of the arrow causes the arm 63 to move first counter clockwise to rock the shaft about 60 degrees in the same direction. The arm and shaft remain in this position for a short while and then are returned to their normal position in which they are shown in Fig. 1.

Fast on the shaft 56 are arms 67, one for each bank of keys (Figs. 1, 2, 3 and 5). Each arm at its outer end carries an arm 68 loosely mounted on a pin 69. Springs 71 which extend between the pins 72 on the arms 67 and the lower ends of latches 73 mounted on the arms 68 by the pins 74 tend to urge the upper arms of the latches 73 forward, but the latches and therefore the arms 68 are prevented from movement as the latches carry lugs 75 which engage shoulders 76 formed in the edges of slots 77 in the arms 67. When the arms 67 are raised rollers 78 pivoted on the upper ends of the arms 68 contact with the rear edges 79 of the determining arms 24 pivoted at their lower ends by sleeves 81 secured to the determining members 24 and supported by ears 82 on the key frames 11. The edges 79 extend across the path of the rollers 78 and thus the upward movement of the arms 67 normally urges the determining arms 24 to rock forwardly their full nine units of movement by the rollers 78 contacting with the edges 79. Latches 73 (Figs. 2 and 3) carry at their upper ends pins or rollers 84 to engage either the zero trips 36 on the levers 35 or the inner ends of the keys 10 when the latter are in depressed position.

From the above construction it follows that on the upward movement of the arms 67 the rollers 78 on the arms 68 rock the determining arms 24 forwardly until the pins 84 on the latches 73 engage the inner ends of the depressed keys, which engagement results in the latches 73 rocking rearwardly and thus becoming disengaged from arms 67 at the shoulders 76 after which the continued upward movement of the arms 67 merely results in counter clockwise (Fig. 2) rocking of arms 68. When a key is not depressed in one bank the roller 84 on the latch 73 for such bank engages the zero trip 36 and consequently during the entire upward stroke of the corresponding arm 67 the arm 68 is rocked rearwardly and permits the corresponding determining member 24 to remain in its zero or normal position.

In order to set the indicators 91 (Fig. 1), type carriers 92 (Fig. 6) and differentially rotate the totalizer pinions 93 (Fig. 5) the determining members 24 are each provided with a slot 94 which, when the member 24 is in its nine position or farthest from normal, is practically though not exactly concentric with the rock shaft 56. Extending through each slot 94 is a roller 95 on a segment gear 96 which is bell crank in form and pivoted by a pin 97 on the arm 67. Each segment gear 96 meshes with a segment gear 98 loosely mounted on the shaft 56. Integral with this latter segment gear but of greater radius is another segment gear 99 (Fig. 5) which is employed to actuate the totalizer pinions after the pinions are thrown into engagement with its teeth.

Differential movement is communicated to the segment gear 99 in an adding operation from the fact that this segment gear, segment gears 96, and 98, and arms 67 and 68 move more or less as a unit while the determining member 24 is being rocked forwardly by engagement of the roller 78 on the arm 68, with the edge 79 of the member. When the roller 84 on the latch 73 engages the depressed key the latch is rocked out of engagement with the shoulder 76, thus breaking the rigid connection between the arms 68 and 67 and therefore the arm 68 may rock rearwardly during the continued upward movement of arm 67 and consequently the slot 94 of the determining member 24 serves through the roller 95 to rock the segment gear 96 counter-clockwise thus causing it to roll to some extent over the segment gear 98 during the remainder of the upward movement of arm 67.

With the above described mechanism it is possible in an adding operation to distribute the work of setting the actuating racks 99 as desired throughout the operation of the driving mechanism regardless of the extent of the rotation to be imparted to the accounting elements. Thus the slot 94 in the determining member 24 may be of such form and the groove 57 so designed that the actuating element will only be slightly rotated at the beginning of the operation, gradually increasing its speed during the middle of the operation, and decreasing the speed toward the end when the roller 95 arrives in the upper end of the slot 94. In the operation of the differential mechanism while the arm 67 and the segments 96 and 98 move more or less as a rigid unit up to where the roller 84 engages the depressed key, there is, however, some rolling action between the segment gears 96 and 98 depending upon the curvature of the slot 94 and the extent of forward movement of the member 24. Any rolling action between the segment gears 96 and 98 decreases or increases the extent of movement which would be imparted to the gear if the arm 67 and the segment gear were rigid.

The extent, direction, and speed of movement of the parts just described may now be considered in further detail. On the upstroke of the arm 67 in an adding operation relative movement between segment gears 96 and 98 varies in speed depending upon the key depressed. When no key is depressed in a bank the corresponding zero stop 36 will remain in the path of movement of a roller 84 on the latch 73. The latch for this bank will thus become disengaged from the shoulder 76 at the beginning of the upstroke of the arm 67 and consequently the arm 68 which engages with the determining member 24 at its edge 79 will rock idly rearward and will not therefore move the corresponding determining member away from normal position. Then with respect to this bank the upward travel of the roller 95 from its normal position to the top of the slot 94 will coincide with the normal position of slot 94 so that the segment gear 96 will idly roll around the segment gear 98 during the entire upstroke and therefore permit the actuating segment to remain in normal position.

When any one of the five lower amount keys is depressed the segment arm 96, until the latch 73 is tripped by the key depressed, will be caused to rock counter-clockwise (Fig. 2) about the pin 97 more or less, dependent upon which of the keys is depressed. This counter-clockwise movement of the segment gear 96 does not drive the segment gear 98 in a clockwise direction, but merely decreases the extent of movement which would be imparted to this latter segment gear if the arm 67 and the gears 96 and 98 were rigid. This is true because the rocking of the segment gear 96 is of less speed than the rocking of the arm 67 and the counter-clockwise movement of the segment gear 96 results in rolling of this segment gear over the segment gear 98. After the roller 84 has engaged the end of a depressed key the rolling action between the segment gears depends entirely upon the angular setting of slot 94 as from that time until the roller 95 reaches the top of the slot 94 at the end of the upstroke of the driving arm 67 the determining member 24 is locked in its adjusted position as will be described presently.

The relative movement between the segment gears 96 and 98 changes direction during the upstroke of the driving arm 67 if one of the four upper amount keys has been depressed. For convenience the movement of the segment gears will be considered when the eight key is depressed in a bank. During movement of the roller 95 from zero or normal position to the position which it would be just before the latch 73 would have been tripped, by a "five" key if the latter had been depressed, the segment gear 96 will be rocked counter-clockwise as described above. The direction of this rocking is reversed after the roller 95 moves from this position until the latch 73 is tripped by the depressed "eight" key, after which the segment arm will again be rocked in a counter-clockwise direction until the roller reaches the upper end of the slot 94. Rocking of the segment 96 in a clockwise direction after the roller 95 has passed the position in which the latch would have been tripped by a five key, and before the latch is tripped by the 8 key, increases the speed of the segment gear 98 as such rocking drives the segment gear 98 in a counter-clockwise direction and so the latter segment gear moves faster than it would be moved if it was rigid with the segment 96. It can readily be seen that the segment gear 96 will be moved as just stated from the following observation. The distance between the points of centers of the rollers 78 and 95 as they move from zero position to the position in which the roller 84 on the latch 73 would engage the five key, if the latter had been depressed, gradually decreases as the distance between the edge 79 and the rear edge of the slot 95 is gradually decreasing from the lower end of the slot to practically that point. It is to be remembered that the roller 78 always engages the edge 79 to drive the member 24 forward until the latch 73 is tripped and also that the slot 94 is eccentric with the shaft 56 so that as the roller 78 gradually throws the member 24 forward the slot 94 is gradually guiding the roller 95 nearer the roller 78 and therefore the segment gear 96 is rocked counter-clockwise. After the roller 78 has left its five position, the latch 73, still being in acting position, continues to force the member 24 forward but now the distance between the edge 79 and the slot 94 is gradually increasing so that the roller 95 is being pushed forward and therefore away from the roller 78. The roller 95 is in fact approximately at the same distance from the shaft 56 when the latch is tripped by a nine key that it is when it is in normal position so that when a nine key is operated the extent of angular movement of the segment gear 98 and therefore of the actuating gear 99 is the same as that of the arm 67, the extent of the counter-clockwise movement of the segment gear 96 while the roller is traveling to the position in which the latch 73 would be tripped by a five key, being practically the same as the clockwise movement of the gear during the continued movement of the arm 67 until the latch is tripped by a nine key.

When the latch has been tripped by the engagement of the depressed key the corresponding determining member 24 is in such position that its forward edge 23 engages the pin 21 on the depressed key and consequently the determining member 24 acts as a rigid guide for rocking the segment gear 96 counter-clockwise during the continued upward movement of the arm 67, the rigid connection between the arm 67 and the segment gears having been destroyed.

The segment gear 96 will always be rocked counter-clockwise after the latch 73 has been tripped, regardless of the key depressed, although of course the extent of rocking depends upon the extent of travel of the roller 95 after the latch has been tripped. The segment gear 96 is always rocked in this direction after the key is tripped as the slot 94 is eccentric with the shaft 56 and the upper end of the slot is always nearer the shaft than is the lower end, and this is true even when the latch is tripped by a nine key but in the latter case the difference in the distances is very slight. Therefore the slot acts as a guide to force the roller 95 toward the shaft and thereby rock the segment gear 96.

With the particular form of curve shown in the drawings the rocking movement of the segment gear 96 is greater after the latch is tripped than before as the roller 78 before the latch is tripped gradually pushes the cam slot 94 forward so that the path of the roller 95 tends to conform to an arc struck from the shaft 56, but after the key is tripped the path of the roller is much more eccentric about the shaft than was its path before the latch is tripped, since continued forward movement of the member 24 is prevented by its engagement with the pin 21 of the depressed key.

As the rolling of the segment gear 96 varies it is evident that it is possible to regulate its speed of rotation and therefore the speed of rotation of the segment gear 98 as desired, by changing the form of the curve made by the edge 79 of the member 24 and the curvature of the slot 94. For example, suppose the slot 94 was of greater radius and that the center from which the arc was drawn through the center of said slot, was so chosen that the central points in the ends of the slot as shown in the drawing, were included in the arc. Then the forward position of the slots 94 would be less and consequently more rolling would occur during the first part of the operation of the machine and less rolling after the disengagement of the latches 73, than there is with the slots as shown. If the curve 79 of the determining member 24 was of greater radius and drawn through the point of the curve shown in the drawings, opposite the "five" key there would be less rolling between the segment gears 96 and 98 before the latch corresponding is tripped and more rolling during the continued movement of the roller 95 than there is with the curve 79 shaped as shown.

In order to operate the totalizer it is thrown into mesh with the actuating segments 99 upon the return movement of the racks to normal position and the means by which this engagement is accomplished will be hereinafter fully described. While the arms 67 are being given their down stroke to normal position the determining members 24 are kept alined in their adjusted positions. In order to aline the members 24 to prevent rearward movement of the same after the latches 73 (Fig. 2) have been disengaged from the shoulders 76 and thus cause rearward movement of the arms 68 and also to prevent movement of the members 24 during the return movement of the arms 67, the members 24 are each provided with a set of alining teeth 102 which are engaged by lugs 114 carried by plates 103 loosely journaled on a shaft 104 and having extensions 105 between which and a rod 106 are springs 107.

The rod 106 (Fig. 11) is carried by two arms 108 loosely mounted on either end of the shaft 104 which extends longitudinally through the machine. The arms at their lower ends carry rollers 111 extending into grooves 112 in disks 113 fast on the main drive shaft 53. The grooves are so constructed that at the beginning of an operation of the machine the arms 108 and therefore the bar 106 are moved rearward to throw the lugs 114 on the plates 103 into engagement with the teeth 102 of the determining members 24 so that when the determining members 24 are thrown forward the lugs 114 idly ratchet over the teeth and prevent backward movement of the determining members after the rear edges 23 of the members have contacted with pins 21 on the depressed keys and the lugs 114 are not moved out of engagement with the teeth until near the end of the operation of the machine as will be described later.

It is evident that upon return movement of the roller 95 (Fig. 2) from its position at the upper end of the slot 94 to the position in which it was when the latch was tripped upon the upstroke of the arm 67, the segment gear 96 will be rocked in a reverse direction, that is clockwise, and that the change in the speed of such rocking will be the reverse of that on the upstroke. The rocking of the segment gear 96 upon continued movement downward of the arm 67 from this position until the roller 95 has reached its normal position at the lower end of the slot 94 is not, however, the reverse of the movement on the upstroke, as during the upstroke the roller 78 in moving up to this position gradually threw the member 24 forward whereas now this member is locked in its set position. This rotation of the segment gear 96 and therefore the rolling action between the segment gears 96 and 98 gradually increases as the lower end of the slot is approached by the roller 95. It is obvious that as the arm 67 has an invariable extent of movement and the member 24 has a fixed pivotal center the roller will always be brought into engagement with the lower end of the slot 94 and the operating member will return to home position, and as the slot 94 is eccentric with the rock shaft 56 the segment gear 96 is constantly rotated clockwise during the return movement of the arm 67 and therefore the entire down stroke of the arm 67 is utilized to restore the actuating segment gear 99 to zero position.

The cam slot 57 through which the driving arms 67 are rocked is so timed that the arms are restored to normal position before the main drive shaft 53 has completed its rotation and during the time for the shaft to complete its rotation the determining members 24 are moved rearward to normal position. For this purpose each zero strip carrying lever 35 at its lower end is provided with an anti-friction roller 115 which passes through a slot 116 in the key frame 11 and is normally in engagement with the lower end of the forward edge 23 of the corresponding determining member 24. Depression of a key or operation of a total lever 250 (Figs. 1 and 2) permits the zero trip carrying lever 35 to be rocked under the influence of the spring 33 to carry the roller 115 forward and thereby permit movement of the member 24. When the lever 35 is restored to normal position at the end of the operation of the machine, as has been described, its determining member 24 is moved to normal position through the engagement of the roller 115 with the determining member. A pin 117 on the key frame passes through a slot 118 in the lower end of the lever 35 to guide the lever in its oscillatory movements. The latches 73 are also restored to latching position at the end of the operation of the machine and this is accomplished near the end of the return movement of the driving arms 67 by the engagement of fingers 119 on the arms 68 with studs 120 (Fig. 5) projecting into the path of the fingers and from stationary plates 130 (Figs. 1 and 5) as the arms 68 are thereby rocked forward and the lugs 75 on the latches are moved into engagement with the shoulders 76 by the springs 71.

*Counter and transfer mechanism.*—The totalizer pinions 93 (Figs. 1 and 5) are loosely mounted on a tubular shaft 121 which is carried by arms 122. The right hand arm 122 is fast on a shaft 123 (Fig. 9). The left hand arm 122 is pivotally mounted on the left hand side frame of the machine. Loosely mounted on the shaft 123 is a lever 124 (Fig. 7) which is bifurcated at its lower end and normally straddles a squared projection 125 (Fig. 9) on a selecting bar 126 slidably carried in rectangular slots 131 (Fig. 7) in arms 127 rigid on the shaft. The upper end of the lever 124 is pivotally connected at 128 to a pitman 129. The pitman at its rear end is forked over the shaft 61 and also carries a roller 132 projecting into a cam groove 133 formed in the face of a disk 134. The disk 134 is rigidly mounted upon the shaft 61 which is given one complete rotation at each operation of the machine as a gear 135 (Fig. 1) is rigidly mounted on the shaft and given one complete rotation through the gear 55 with which it meshes. The configuration of the cam groove 133 is such as to rock the lever 124 and therefore through the bar 126 mounted in the arms 127, the shaft 123. After the arms 67 have come to rest at the end of their upstroke and before they begin their return movement, the rocking of the shaft 123 throws the totalizer pinions 93, because the totalizer frame is rigidly mounted on the shaft 123, into mesh with the actuating segments 99 so that upon return movement of the actuating segments the totalizer will be actuated to an extent commensurate with the amount set up on the amount keys.

The transfer mechanism which is shown in Figs. 5 and 15 includes a frame for each bank of keys except the bank of highest denomination. The frames which are loosely mounted on a tubular shaft 136 suitably supported by the side frames of the machine, comprise arms 137 and 138 and these arms are connected by and integral with a horizontal bar 139. The arm 137 of each frame carries three teeth 141 normally in engagement with the corresponding totalizer wheel. A trip pawl 140 is pivotally connected to the upper end of the arm 138 by a pin 142ª and this pawl is normally in the plane of the totalizer wheel of next lower denomination. The trip pawl 140 has a beveled nose 142 on its lower portion and the nose is normally held in engagement with the foremost of the three notches 140ª on an arm 143 loosely mounted on the shaft 136 between the transfer frames. This engagement is normally maintained by a spring 144 which is under tension between the extension 147 of the arm 143 and the rear end of the trip pawl 140. The forward end of the trip pawl 140 is provided with a notch 145 which is engaged by a long tooth 146 on an adjacent totalizer pinion when the pinion passes from its eight to nine position. This engagement rocks the pawl 140 clockwise without affecting the transfer frame supporting the pawl. When the pawl 140 is rocked in this manner the spring 144 raises the arm 143 so that the second of the notches 140ª in the arm 143 will engage the nose 142 of the pawl, and the pawl on the left in Fig. 15 is shown in this position. In this position the upper inclined edge 148 on the lower portion of the trip pawl passes into engagement with the rear edge of a horizontal lug 149 on the arm 137 which forms part of the transfer frame bearing the three teeth normally engaging this pinion which has engaged and partially tripped the pawl. If the transfer pinion passes from its nine to its zero position the trip pawl 140 is rocked still farther about its pivotal center 142 by the long tooth and the spring 144 raises the arm 143 so that the nose 142 will engage the third notch in the arm and this is the position that the middle transfer pawl in Fig. 15 of the drawings has assumed. In this position of the pawl 140 the edge 148 of the pawl is in engagement with the rear edge of the long horizontal bar 151.

A bail (Figs. 5 and 15) comprising the horizontal bar 151 integral with arms 152 fast to the shaft 136 is rocked counter-clockwise to effect the simultaneous rocking downward of all of the transfer frames which are to effect required transfers, and this rocking takes place before the totalizer is restored to its normal position into engagement with the teeth 141. The bail is rocked in a manner to be presently described near the end of the operation of the machine and before the totalizer has been rocked out of engagement with the actuating segments 99. When the bail is rocked the horizontal bar 151 of the bail being in engagement with the edges 148 of all of the pawls 140 which have been fully tripped moves the pawls bodily rearward with the transfer frames supporting the tripped pawls, without relative movement between the pawls and the frames. The cam for rocking the transfer bail is so shaped that the bail and the operated transfer frames come to rest for a short time at the end of their clockwise movement and the "add" cam then rocks the totalizer back to normal position into engagement with the teeth 141 of the transfer frame. As the bail is rocked back to normal position the operated transfer frames are also restored to normal position and the teeth 141 of the frames being in engagement with the corresponding totalizer pinions cause the pinions to be moved the required one step. The transfer frames are restored to normal position to effect these transfers by springs 170 (Fig. 5). There is one spring for each transfer frame and each spring passes about the tubular shaft 136 and at one end is seated in an opening 180 in the shaft, the other end being bent to engage the forward edge of the horizontal bar 139 of the transfer frame.

If one pinion is moved from its nine to its zero position by its actuating segment gear 99, the trip pawl 140 adjacent this pinion is fully tripped and if the pinion of next higher order has moved from its eight to its nine position by its actuating segment gear, it is evident that, when one is added on the second mentioned pinion by the carrying operation from the first mentioned pinion, a carrying operation from the second mentioned pinion to the pinion of next higher order is necessary. It has been stated that when a pinion moves from its eight to its nine position the adjacent trip pawl 140 is rocked about its pivot and the spring 144 raises the arm 143 to the right (Fig. 15) of the transfer frame supporting the pawl so that the middle notch of the arm 143 engages the nose 142 of the trip pawl and the surface 148 of the pawl passes to the rear of the lug 149 on the arm 137 of the transfer frame carrying the transfer teeth 141 normally in engagement with this pinion tripping the pawl. It is therefore clear that when the bail is rocked, the rocking of the transfer frame to effect a transfer from the first mentioned totalizer pinion, that is the pinion which has passed its zero position to the second totalizer pinion that is the one which is in its "nine" position will rock the transfer frame of next higher order as the lug 149 of the frame moving the second mentioned pinion by its engagement with the edge 148 of the trip pawl also rocks this last mentioned frame, carrying the partially tripped pawl. The deep recess 153 formed between the upper and lower portions of the trip pawls 140 is provided to prevent the engagement of the pawl, when the pawl is moved bodily rearward, with the forward edge of a lug 149 on the transfer frame of next lower denomination.

The cam and connections for rocking the transfer bail at the proper time are shown in Fig. 14. An arm 155 is fast to one end of the hollow shaft 136 and the upper end of the arm is connected by a pin 156 to a pitman 157. The pitman at its rear end is forked over the shaft 61 and carries an antifriction roller 159 playing in a cam groove 161 in a disk 162. The cam groove is so designed that the pitman is given a rearward movement to rock the shaft 136 counter-clockwise and therefore the bail near the end of the operation of the machine and before the totalizer is rocked out of engagement with its actuating segment gears 99 and after the totalizer is thrown into engagement with the teeth 141 on the transfer frames the bail is restored to normal position to permit the springs 170 to restore the transfer frames to normal position to effect transfers.

After the transfer frames have been rocked to effect transfers, lugs 136ª (Fig. 15) on the shaft 61 engage the upper ends of the projections 147 of the arms 143 and rock these arms downward about the shaft 136 so that the noses 142 of the trip pawls, which were tripped, are restored under the influence of the springs 144 to their normal position in which position they rest in the foremost notches of the arms 143.

*Indicator mechanism.*—The indicators 91 are differentially rotated on the upstroke of the arms 67 in accordance with the differential setting of the members 24 and the consequent path of the roller 95, by segment gears 165 pivoted on a shaft 166 and having slots 167 through which rollers 95 on the forward arms of segment gears 96 extend (Figs. 1 and 4), there being one member 165 for each denominational order represented. The slots 167 are triangular in form having their greatest width at their bases and are also curved at their forward edge in about the same way as slots 94. The upward movement of the rollers 95 as guided by the slots 94 causes the rollers to engage one side or the other of the slots 167 and thus differentially position the segment gears 165. Rollers 95 are free of the edges of the slots 167 on the return movement of the arms 67 as during the upstroke of the arms the segment gears 165 are so positioned that their forward edges coincide with the forward edges of the slots 94 and the rear edges of the slots 167 are so formed as to permit the full rearward movement of the members 24 when the rollers 95 are in the bottom of slots 167 without causing rollers 95 to engage the rear edges of the slots 167.

The segment gears 165 have teeth 168 meshing with teeth 169 rigid with indicator setting gears 171 which mesh with pinions 172 integral with the indicator wheels, and consequently differential rocking of the segment gears 165 forwardly or backwardly by the rollers 94 engaging with the edges of the slot 167 causes the indicators to be set differentially as desired from one setting directly to another and this setting movement occurs during the upstroke of the arms 67.

In order to aline the indicators (Fig. 1) in their set positions at the end of the upstroke of the arms 67 the gears 171 are provided with alining notches 173 which are normally engaged by noses 174 of arms 175 rigidly mounted on the shaft 104 which extends longitudinally through the machine and passes through slots 177 in the members 165, the slots being concentric with the fixed pivot 166 of the members 165 to permit movement of the members. The shaft is rocked to throw noses 174 of the arms 175 out of and into engagement with the alining notches of the gear 171 by the cam groove 178 which operates an arm 179 fast to the shaft 104 through engagement of a roller 181 on the arm in the cam groove. The cam groove is so constructed that the shaft is rocked to lower the arms out of engagement with the alining teeth at the beginning of the operation of the machine and to rock the arms to normal position after the members 165 have received their differential adjustment on the upward movement of the arms 67.

*Printing mechanism.*—The printing wheels 92 are set simultaneously with and to the same extent as the indicators, as pinions 181ª (Fig. 6) at the side of and rigid with the printing wheels engage the teeth of gears 182 and these gears are of the same diameter and moved to the same extent as the indicator actuating gears 171 by means of pinions 183 meshing with the gears 182 and corresponding pinions 184 (Fig. 1) meshing with corresponding gears 171. These pinions 183 and 184 are mounted on shafts 185 there being one shaft for each bank of keys. It is therefore evident that when the indicators are differentially rotated on the upstroke of the arms 67 the printing wheels 92 will be moved a like extent.

After the arms 67 have come to rest at the end of their upstroke a platen 186 formed of any suitable resilient material forces the detail strip 187 against the type on the printing wheels so that an impression of the amount on the wheels may be made on the detail strip. The platen 186 is mounted by a pin 188 on an arm 190 of a bell crank lever 189 loosely mounted on the main drive shaft 53. The lower end of the other arm 200 of the bell crank lever 189 carries an anti-friction roller 191 engaging in a cam groove 192 formed in the face of a disk 193 rigidly connected to the gear wheel 55. The cam groove 192 is of duplicate formation and is so constructed that upon each operation of the machine that is upon each one-half rotation of the cam 193 the bell crank lever 189 is rocked counter-clockwise to raise the platen 186 against the type carriers after the type carriers have been differentially positioned.

The detail strip which passes from the supply roll 196 mounted on a pin 197, projecting from plate 198 fastened on the side frame of the machine by screws 199, is fed over guide pins 213 on to a storage roll 201 pivotally mounted by a pin 202 on the forward end of the plate 198. A bell crank lever 203 which is also pivoted on the pin 202 carries a feed pawl 204 which is held in engagement with the teeth of a ratchet wheel 205 rigid with the storage roll by a spring 206 which is compressed between a stud 207 on the bell crank lever 203 and the pawl 204. The bell crank lever at 208 is connected to a pitman 209 which is forked over the main drive shaft 53. The pitman carries a roller 210 playing in a cam groove 211 constructed in the face of a disk 214 which is rigidly mounted on the right hand end of the main drive shaft. After an impression has been taken on the detail strip the bell crank lever 203 is rocked about the pin 202 by the cam groove 211 and the pitman 209, and through the pawl 204 feeds the detail strip 187 one step so that a fresh surface on the detail strip may be brought into printing position for the next operation of the machine. A spring pressed pawl 212 on the plate 198 prevents backward rotation of the storage roll as it is constantly in engagement with the teeth of the ratchet 205.

The inking ribbon 215 is of the continuous type and passes over the roller 216 below guide pins 217 and around the roller 218. The roller 218 has fast thereto a ratchet wheel 219 which is engaged by a projection on the upper end of a lever 220 mounted at 222 on the bell crank lever 189. A spring 221 connected to the rear end of the lever 220 is compressed between the lever and a stud on the bell crank lever 189 to keep the lever 220 into engagement with the ratchet wheel 219. When the bell crank lever 189 is rocked so that the platen is raised against the printing wheels, the lever 220 is raised, without affecting the ratchet wheel 219, but the projection on the upper end of the lever engages the next tooth on the wheel 219 in order to move this ratchet wheel and therefore the inking ribbon one step when the lever is restored to normal position.

*Total taking operations.*—To turn the totalizer to zero and print the totals originally on the totalizer, the totalizer is rocked into engagement with the actuating segment gears 99 before the forward movement of the latter from normal position is begun and rocked out of engagement at the end of such movement, if the totalizer is to be left at zero, and held in engaging position until the segment gears are returned to normal position if the totalizer is to be restored to its original position. The means for establishing the desired coöperative relationship between the totalizer and the actuating segment gears 99 will now be described. The device for throwing the totalizer into engagement with the actuating segments during the downward stroke of the arms 67 in an adding operation has been described so that it will only be necessary to describe here, the means controlling the time of engagement of the totalizer in "read" and "reset" operations of the machine.

In a "read" operation for the purpose of having the totalizers thrown into engagement at the proper time, the bar 126 (Fig. 9) slidably supported by the arms 127 which are rigid with the shaft 123 carrying one side of the totalizer frame is moved to the left so that the bifurcated end of a lever 231 constructed similarly to the lever 124 will straddle the projection 125 of the bar 126. This lever which is loosely mounted upon the shaft 123 at its upper end is connected to a pitman 232 which is similar to the pitman 129. The pitman 232 and the lever 231 are also similar to a pitman 233 and a lever 239 (Fig. 8), but the pitman 232 and the lever 231 cannot be seen in this figure because they are in the same line of sight as the pitman 233 and the lever 239. The pitman 232 carries a roller to the right of a roller 234 carried by the pitman 233 and the roller carried by the former pitman plays in a cam groove 235. This cam groove is formed in the face of a disk fast on the shaft 61 and is shown in dotted lines in Fig. 8 because the disk is of the same diameter and to the right of a disk 237. The shape of this groove 235 is such as to rock the totalizer into engagement with the actuating gears at the beginning of the forward movement of the rack and to maintain in such engagement until after the actuating gears have completed their return movement to normal position. The rocking of the lever 231 while the projection 125 is in engagement with its bifurcated end, rocks the totalizer into engagement at the proper time as the rocking of the lever rocks the arms 127, the shaft 123 and therefore the arms 122 supporting the totalizer shaft 121.

In "reset" operations of the machine the bar 126 is slid one step further to the left so that the projection 125 is brought into engagement with the bifurcated end of the lever 239 (Figs. 8 and 9). At its upper end this lever is connected to the pitman 233 carrying the roller 234 which plays in a cam groove 241 formed in the face of the disk 237. When the projection 125 is in engagement with this lever the totalizer is rocked into engagement with the actuating racks at the beginning of the upstroke of the arms 67 and disengaged from the actuating racks while the arms are at rest at the end of their upstroke. The three levers 124, 231, and 239 are prevented from moving laterally on the shaft 123 by the spacing sleeves 240 surrounding the shaft between the levers. It will be understood of course, that at every operation of the machine the three levers 124, 231 and 239 will be rocked by their respective cams but the rocking of any one of the levers is effective to rock the totalizers into and out of engagement with the actuating racks, only when the projection 125 of the bar 126 is in engagement with its bifurcated end.

In order to slide the plate 126 so that the projection 125 will be in engagement with the lever actuated by the selected cam, a lever 242 pivoted at 243 to the side frame of the machine is provided (Fig. 10). Projecting laterally from the lever is a pin 245 passing into the slot 246 formed in the lower end of a link 247. The link at its upper end is pivoted by a pin 248 to an arm 249 (Fig. 1) rigidly mounted on a shaft 240 which is rocked by the total lever 250 also fast thereon. The rear end of the lever 242 (Fig. 10) carries a roller 251 normally in position to play in a groove formed by two concentric ribs 252 and 253 on the face of a disk 254 during the rotation of the shaft 61 upon which the disk is rigidly mounted. Upon movement of the total lever to indicate a "read" or "reset" operation of the machine the lever 242 is rocked about its pivotal center 243 and the roller 251 is raised into a position in which it will play in a groove formed by the concentric rib 252 and a rib 255, or in the inner groove between the rib 255 and the annulus 2561. The playing of the roller 251 in any one of the grooves formed by these ribs prevents movement of the lever 242 during an operation of the machine. The slot and pin connection between the lever end of the link 247 and the lever 242 is provided as the total lever operating the link 247 is restored to normal position before the lever 242 is restored to its initial position as will be presently explained and the slot and pin connection permits the link to be lowered upon restoration of a total lever independently of the lever 242.

The forward portion of the lever 242 (Figs. 9 and 10) is enlarged and the face of this enlarged portion 256 is concentric about the pin 243 and has a cam groove 257 in which a roller 258 projecting laterally from the right hand end of the slide 126 engages. The cam groove 257 is so designed that rocking the lever 242 by the hand lever 250 to select the "read" cam for rocking the totalizer into engagement at the proper time with the actuating segments 99, slides the plate 126 one step to the left so that the projection 125 is taken out of normal engagement with the bifurcated end of the lever 124 actuated by the "add" cam 133 and moved into engagement with the lever 231 which is actuated by the "reset" cam 235. For a "read" operation the hand lever 250 is moved farther forward to raise the lever 242 and the cam slot 257 slides the projection 125 of the plate 126 into engagement with the lever 239 which is actuated by the "reset" cam 241. The lever 242 is locked in its adjusted position by the concentric ribs on the disk 254 to prevent displacement of the lever so that the projection 125 is kept into engagement with the lever before being actuated by the selected cam and in order that the roller 258 will enter the slot 257 when the bar 126 and arms 127 are rocked back to normal position. A spring 261 (Fig. 7) connected to a pin 262 on the lever 242 and a pin 260 of a vertical plate 263 restores the lever 242 to normal position when the openings in the concentric ribs 252 and 255 reach the roller at the end of the operation of the machine. The lower edge of the bar 126 is provided with three notches 264 (Fig. 9) which are adapted to be brought into register with the vertical plate 263 when the bar 126 is moved laterally so that when the bar 126 is rocked during an operation of the machine away from the cam 256 the notches will straddle the edge of the plate to prevent displacement of the bar 126 while the roller 258 is out of engagement with the cam groove 257 in the lever 242.

The counter-clockwise movement of the actuating segment gears (Fig. 5) upon the upstroke of the arms 67 and after the totalizer has been thrown into engagement with the segments gears effects clockwise movement of the totalizer pinions. This reverse movement of each totalizer pinion is adapted to be stopped when the latter reaches zero position, by the engagement of a long tooth 266 on each pinion with the rearwardly extending arm 267 (Fig. 5) of a corresponding bell crank lever pivoted at 268 to the plate 130 loosely mounted on the rock shaft 56 and the shaft 271 to permit movement of the shafts without affecting the plate. The arm 267 carries a laterally projecting stud 272 in the plane of a lever 273 pivoted to the arm 67 by pin 274. When the bell crank lever 267 is rocked by engagement of a long tooth 266 as the totalizer passes from its nine to its zero position the stud 272 engages the edge of the lever 273 and rocks the latter clockwise. The forward end 275 of the lever 273 extends over the arm of the latch 73 supporting the lug 75 so that when the lever 273 is rocked by the long tooth the lug 75 of the latch 73 is thrown out of engagement with the shoulder 76 to permit rearward movement of the arm 68 during the continued movement of the arm 67. The rear end of the lever 273 carries a projection 278 which prevents undue displacement of the arm 273 as the projection projects into a groove formed in a pin 279 on an arm 281 integral with the arm 67.

In order to aline the actuating gears 99 in their set positions when the totalizer pinions have been reset to zero, arms 283 provided with pins 284 are employed. The arms are loosely mounted on the shaft 271 and carry lugs 285 normally in engagement with shoulders 286 formed on the downwardly extending arms 287 of the bell crank levers 267. Springs 288 connecting projections 289 of the arms 283 with pins 290 on the bell crank levers 267 normally maintain the engagement of the lugs 285 with the shoulders 286. When each bell crank lever 267 is rocked by the long tooth 266 on the adjacent pinion, the shoulder 286 is carried out of engagement with the lug and the lug is drawn up into engagement with the shoulder 291 so that the stud 284 may pass between the teeth of the actuating rack 99 and lock the rack from further movement. After the arms 67 come to rest at the end of their upward stroke arms 283 are rocked back to normal position so that the actuating racks may be returned to zero position on the return movement of the arms 67. To this end arms 292 fast to the shaft 271 and beside the pawls 283 are rocked downward to engage studs 293 on the pawls 283 so that when the arms 283 are carried back to normal position the springs 288 will pull the bell crank levers 267 to normal position. The shaft 271 is rocked to lower the arms 292 at the proper time by means of a cam 294, (Fig. 13). A pitman 295 has a roller 296 engaging in the groove 297 of the cam and the lower end of the pitman is pivotally connected to an arm 298 fast to the shaft so that near the end of the rotation of the cam the pitman is reciprocated to rock the shaft 271. Simultaneously with the restoration of the arms 283 the trip levers 273 are restored to normal position by springs 300 connected to pins 310 on the levers and to pins 72 on the arms 67.

That part of the long tooth 266 which projects from the outer circle of the pinion is formed on the right side of the tooth which is in engagement with the corresponding actuating rack 99 when the pinion passes from its one to its zero position in a read or reset operation of the machine, and that part of the long tooth 146 which projects from the outer circle and is employed to engage the trip pawls 140 in an adding operation is formed on the left side of the tooth which is opposite the pawl as the pinion passes from its nine to its zero position in an adding operation so that the arms 267 will only be operated by the long teeth 266, and the trip pawls 140 only by the long teeth 146. In order to prevent the teeth 146 from engaging the pawls 140 when the totalizer pinions are turned clockwise in a turn to zero operation, the shaft 61 is provided with cam projections or flanges 270 which, while the pinions are being turned to zero on the upstroke of the driving arms 67, engage the rear ends of the arms 137 and thereby rock the transfer frames carrying the trip pawls rearward so that the pawls are taken out of the path of the long teeth. The cam projections 270 are so formed that they pass out of engagement with the ends of the arms 137 before the actuating racks are restored to normal position. As the pawls 140 are then returned to normal position and are therefore in the path of the long teeth 146 when the totalizers are turned back in the read operation to put back on the totalizer the amount originally standing on it, it is evident that means must be provided to prevent actuation of the transfer devices which have been tripped during such return movement of the wheels from effecting the totalizer pinions as otherwise the totalizer would have one added on each pinion if the trip pawl 140 adjacent the pinion of next lower denomination has been tripped, after the actuators have been restored to normal position. To this end the read cam 235 is so timed that the totalizer is not rocked out of mesh with the actuators until after the transfer bail 151 is operated by the cam 161 so that when the transfer frames are rocked the teeth 141 are not in engagement with the pinions.

In read and reset operations of the machine the operation of the differential mechanism is different during the upstroke of the arms 67 than was the operation during the entering of items and the operations of the differential mechanism in read and reset operations will now be described. On the upstroke of the arm 67 in an adding operation as described, the full stroke is required to give the actuating racks 99 their full extent of movement, part of the movement being imparted after the determining members 24 are prevented from moving farther forward by the engagement of the rear edges with the pins 21 on the depressed keys. In total taking operations, however, no key is depressed and the zero trip 36 in each bank is taken out of the path of the roller 84 and the latch 73 is tripped by the totalizer pinion when the latter reaches its zero position. The operation of the differential mechanism must therefore be different in a total taking operation than it was in an adding operation and it will be evident from the following statements that the entire upstroke of each arm 67 is not utilized to communicate to the segment gear 98 and therefore to the actuating segment gear 99 their full extent of differential movement, to turn the totalizer wheel to zero. In an adding operation the latch 73 was tripped by the key depressed before the segment gear 98 had imparted to it its full extent of differential movement. In total taking operations the segment 98 is given its full extent of movement before the latch 73 is tripped. For convenience the operations of these parts during a total taking operation will be considered when "five" is the amount on the corresponding totalizer pinion. The path of movement of the roller 95 and the roller 78 in a total taking operation from normal position until they reach the position in which the latch 73 would be tripped by a five key in an adding operation is the same in a total taking operation as in an adding operation, as the conditions are the same, and in neither operation is the full extent of movement imparted to the segment gear 98. In total taking operations, however, the latch 73 is not tripped when the rollers are in this position since the gear 98 has not received its full extent of movement. Continued movement of the arm 67 until the latch is tripped through the engagement of the bell crank lever 267 by the long tooth 266 throws the arm 24 farther forward than in an adding operation as the latch, being in latching position causes the segment gears 96 and 98 to move farther than in an adding operation nearly as a unit, while in a total taking operation as soon as the segment gear 98 reaches its zero position the arm 283 locks the gear from further movement as has been hereinbefore described. To permit continued movement of the arm 67 and therefore of the segment gear 96, the segment gear must be permitted to idly roll over the segment gear 98 until the roller 95 reaches the upper end of the slot 94 in the determining member 24. This rolling movement causes rotation counter clockwise of the segment gear 96 about its pivot 97, as the roller 95 is gradually being brought nearer the shaft 56, and thereby the determining member 24 is carried rearwardly so that the slot 94 is brought to the position in which it would be at the end of the upstroke in an adding operation if the five key had been depressed.

In order to permit the return movement of the determining member 24 from the position in which it is when the latch is tripped to its position at the end of the upstroke of the driving arm 67, the lug 114 (Fig. 2) is prevented from engaging the teeth 102 of the determining member until after the arms 67 have come to rest at the end of their upstroke. To this end arms 311, one for each bank of keys, are rigidly mounted on the shaft 240 supporting the hand lever 250. The lower end of each of these arms carries a squared lug 313 which, when the lever is moved to indicate a "read" or "reset" operation of the machine, engages the edge 314 of the finger 315 on the plate 103. This edge is normally concentric with the shaft 240 so that when the lug is under the edge 314 the lug 114 is prevented from engaging the teeth 102, when the arm 108 and rod 106 are rocked as has been explained and the rocking of this arm and rod merely compresses the spring 107 between the rod 106 and the projection 105 of the plate.

From the above description it is clear that in total taking operations the segment gears 96 and 98 move a greater extent with the latch 73 in effective position before it is tripped than in an adding operation and that while in an adding operation it requires the entire upstroke of the arms 67 to rotate the gear 98 its full extent of movement, in total taking operations the gear 98 is given its full extent of movement before the latch is tripped. The additional extent of movement of the gears 96 and 98 nearly as a unit in total taking operations imparts to the gear 98 the same extent of movement that the continued movement of the arm 67 imparts thereto after the latch is tripped in an adding operation, when the corresponding totalizer pinion is to be moved to the same extent in both operations. This is possible as it was explained that the movement of the gear 98 in an adding operation was less after the key trips the latch as the rocking of the segment gear 96 was increased and being in the opposite direction though slower than the movement of the arm 67 the movement of the gear 98 was decreased. Now in total taking operations as the roller 95 moves to the position in which the latch would be tripped by a key in an adding operation in which, say, five is to be added on the totalizer, to the position in which the latch is tripped by the totalizer after the totalizer has been turned five spaces to zero, the segment gear 98 is moved the same extent of movement as it did in the adding operation, while the roller 95 completes its movement to the end of the slot after the latch is disengaged by the key.

The slot 94 at the end of the upstroke of the arm 97 is in the same position in which it would be in an adding operation when the actuating gear is given the same extent of movement. As the determining member 24 is locked against movement at the end of the upstroke of the arm 67 upon release of the alining plate 103, as will be presently explained, it is clear that in a total taking operation that upon the return movement of the arms 67 the extent of movement and speed of rotation of the segment gear 96 and therefore the extent of movement of the actuating gear 99 will be the same as in an adding operation and that therefore the actuating gears will be restored to normal position upon every operation of the machine.

The following described device is employed to permit the alining plates 103 to be moved into alining position with the teeth 102 of the members 24 after the arms 67 come to rest at the end of their upstroke. A plate 321 is rigidly mounted on the shaft 240 which supports the total lever 250 (Figs. 2 and 12). A pitman 322 is connected by a pin 323 to the plate 321 and the enlarged lower end has a slot 326 into which the main drive shaft 53 passes. The lower end of the pitman also carries a roller 327 which normally is in position to play in the concentric groove 328 formed in the face of a disk 329. When the total lever has been moved to indicate a "reset" operation of the machine the shaft 240 is rocked, the pitman is raised and the roller 327 is thereby brought into such a position that upon rotation of the disk 329 the roller will first play between concentric ribs 331 and 332 and will then be forced into the outer groove 328 by the cam surface 333, when the driving arms 67 have come to rest at the end of their upstroke. When the lever is moved to indicate a "reset" operation the roller 327 is raised to a position in which it will first engage in the groove 334 and subsequently be moved to operate during the rest of the rotation of the disk 329 in the groove 328. When the roller 327 is moved from between one of these inner grooves and the outer groove 328 the pitman 322 is forced downward and the shaft 240 rocked back to normal position so that the lugs 313 are taken out of engagement with the fingers 314 of the plates 103 to permit the plates to fall into alining position with the teeth 102. The plate 321 is provided with three notches 355 into which the nose 366 of an alining pawl 367 engages. This pawl is pivoted at 368 to the frame of the machine and is pressed upward into engagement with the notches by the spring 369 seated in a pawl and backed by a pin 371 to firmly hold the total lever in its adjusted positions.

As shown in Figs. 1 and 2 each arm 311 carries a laterally projecting lug 372 which, when the total lever 250 is in normal or "adding" position, is out of engagement with the curve 373 of the upper end of its adjacent detent plate 27. When the lever is operated to prepare the machine for a "read" or "reset" operation the shaft 312 and the arms 311 are rocked and the lugs on the latter are thereby all lowered into engagement with the edges 373 of the detents to prevent movement of the detents and therefore operation of the amount keys after the lever has been adjusted to indicate a "read" or "reset" operation of the machine.

In a total taking operation of the machine all of the zero trips 36 must be moved out of operative position and as no keys are depressed, this function is accomplished by the total lever. Studs 375 (Fig. 2) on the arms 311, which are rocked upon movement of the total lever from normal position, engage the inclined edges 376 of arms 377 projecting from the levers 41, and thereby rock the levers 41 so that the lugs 39 on the lower ends of the levers are carried out of engagement with the shoulders 42 on the zero trip carrying levers 35. Springs 33 then cause the levers 35 to rock about their pivotal centers 38 so that the zero trips 36 are carried forward out of the path of the rollers 84 on the latches 73. The levers 35 and the determining members are restored to normal position at the end of the operation of the machine as in an adding operation, through the engagement of the cam portions 51 on the disks 49 with the roller 46 carried at the rear ends of the levers.

*Operation.*—To operate the machine for indicating and recording an amount of a transaction and entering an amount on the totalizer, all that is necessary is to depress the proper amount keys and give the drive shaft 53 one complete rotation. The drive shaft 53 may be rotated either by crank handle suitably geared to it or by a motor which is also common in the art. Depression of the amount keys 10 positions the pins 21 projecting therefrom, into the path of the differential determining members 24. Rotation of the drive shaft 53 causes the shaft 56 and driving arms 67 to rock first counter clockwise (Figs. 1 and 2) about 60 degrees and then clockwise to normal position. The upward movement of the arms 67 through anti-friction rollers 78 on the arms 68 pivoted to the arms 67 gradually throws the determining members 24 forward until their forward edges 23 contact with the pins on the depressed keys and the latches 73 forming a rigid connection between the arms 67 and 68 are tripped. Because of the shape of the curves 79 and the slots 94 of the determining members 24 the intermeshing segment gears 96 and 98 move nearly as a unit until the latches 73 are tripped. After the latches are tripped, however, and until the rollers 95 reach the upper ends of their slots 94 the speed of the rotation of the segment gears 96 which was but slight before the latches 73 were tripped is increased. This rotation after the latches are tripped is in a counter-clockwise direction so that the extent of movements of the segment gears 98 is less than it would have been had the latches 73 remained longer in latching position. In this way differential movement is imparted to the segment gears 98 and therefore to the actuating segment gears 99 for the totalizer, during the entire upstroke of the arm 67. After the latches 73 are tripped and during the return movement of the arms 67 to normal or zero position the corresponding determining members 24 are locked from backward movement by the engagement of the lugs 114 on the plates 103 with the ratchet teeth 102 of the determining members. Upon return movement of the arms 67 the extent of movement of the actuating segment gears 99 is the same as the extent of movement imparted thereto during the upstroke of the arms 67 and the entire return stroke is utilized for this purpose, but the speed of this movement is different than it was during the upstroke. Before the return movement of the arms 67 is begun the totalizer pinions 93 are rocked into mesh with the actuating gears 99 through oscillation of the totalizer frame effected by the cam groove 133 in the disk 134 through engagement of the projection 125 of the sliding selecting plate 126 with the bifurcated end of the lever 124. After the arms 67 are returned to normal position the lugs 114 on the plates 103 are raised out of engagement with the ratchet teeth 102 on the determining members 24, and the detent plates 27 locking the keys in depressed position are moved upward by the engagement of the studs 52 with the levers 28 supporting one end of the detents so that the keys are permitted to return to normal undepressed position under the influence of their springs. Finally the zero trip levers 35 upon being returned to normal position by the cam portions 51 on the face of the disks 49, positively restore the determining members 24 to normal position through the engagement of the rollers 115 on the zero trip levers 35 with the forward edges of the determining members. After the arms 67 have been restored to normal position but before the totalizer is rocked out of mesh with the actuating segment gears 99 and into normal engagement with the teeth 141 on the transfer frames, the transfer bail comprising the arms 152 and the bar 151 is rocked rearward by the cam 161 through the medium of the pitman 157 and the arm 155 which is fast to the tubular shaft 136 upon which the transfer bail is rigidly mounted. When the bail is so rocked it engages the edges 148 of all of the fully tripped pawls 140 and in this way rocks the transfer frames carrying the tripped pawls counter clockwise. If a pinion is moved from its eight to its nine position by the actuating segment gears and the pinion of next lower order has been moved past its zero position by the actuating segment gear 99, the transfer frame for the pinion of next higher order will be moved simultaneously with the movement of the transfer frame of the first mentioned pinion upon operation of the transfer bail through the engagement of the lug 149 on the transfer frame for moving the first mentioned pinion one step with the edge 148 of the trip pawl adjacent this first mentioned pinion. When the transfer bail is restored to normal position the springs 170, one for each transfer frame, simultaneously restore the moved transfer frames to normal position and the totalizer pinions, being in mesh with teeth on the transfer frames, are thereby moved one step.

In operating the machine on a "read" or "reset" operation only the total lever 250 is adjusted and the machine operated. Movement of the total lever rocks the lever 242 and through the cam slot 257 formed in the enlarged end of the lever 242 shifts the bar 126 so that its projection 125 is in engagement with the bifurcated end of the lever 231 if the total lever is moved to indicate a "read" operation and into engagement with the bifurcated end of the lever 239 if the total lever has been moved to indicate a "read" operation. If the projection 125 is in engagement with the lever 231 which it is actuated by the "read" cam the totalizer is brought into engagement with the actuating segment gears 99 before, the upstroke of the arms 167 is begun and moved out of engagement after the arms 67 have been moved to normal position. In the "reset" operation the "reset" cam rocks the totalizer into engagement at the same time as in a "read" operation but rocks the totalizer out of engagement while the arms are at rest at the end of their upstroke.

In both "read" and "reset" operations the lugs 313 on the arms 311 are moved by the total lever 250 under the fingers 315 of the plates 103 to prevent the lugs 114 on the plates 103 from engaging the ratchet teeth 102 on the determining members 24 during the up stroke of the arms 67. When the totalizer pinions reach zero position the long teeth 266 engage and rock the levers 267 so that the studs 272 on the levers 267 will rock the levers 273 carried by the arms 67 and in this way trip the latches 73 through the engagement of the forward ends of the levers 273 with the lugs 75 on the latches. Simultaneously with the tripping of the latches 73 in a total taking operation the springs 288 rock the arms 283 loose on the shaft 271 so that the studs 284 will engage the actuating segment gears and lock them from further movement. On continued movement of the arms 67 after the latches 73 are tripped to the end of their up stroke the segment gears 96 are caused only to roll over the segment gears 98 and the determining members 24, through the rollers 95, are brought to the same positions in which they would be in an "add" operation if the actuators had been given the same extent of movement. In this way the indicators and type carriers are moved to indicate and print the total standing on the totalizer at the beginning of the operation of the machine.

At the end of the up stroke of the arms 67 in a total taking operation the total lever 250 is returned to its normal position by the coöperation of the roller 327 on the pitman 322, which is pivoted to the arm 321 fast to the shaft 240, in the cam grooves formed by the ribs 331 and 332 and the cam portion 333 on the face of the disk 329. Upon restoration of the total lever as just referred to, the plates 103 are lowered under the influence of their springs 107 and the lugs 114 are thereby carried into engagement with the ratchet teeth 102 on the determining members. The studs 284 are carried out of locking engagement with the actuating segment gears at the same time through the engagement of the arms 292 fast on the shaft 271 with the studs 293 which are on the arms 283, the shaft 271 being rocked by the box cam 294 through the link 295 and arm 298 fast to the shaft 271. With the lugs 114 in locking engagement with the teeth 102 of the determining members 24 and the studs 284 out of locking engagement with the actuating segment gears the extent and speed of movement of the actuating gears to normal position on the return stroke of the arms 67 is the same as in an "add" operation in which the determining members 24 have been adjusted to the same positions. After the arms 67 have been returned to normal position in a total taking operation the lugs 114 on the plates 103 are moved out of engagement with the teeth 102 of the determining members and finally the determining members 24 are restored to normal position by the zero trip carrying levers 35 in the same manner in which they are restored during an adding operation.

While the form of mechanism herein shown and described is admirably adapted to fulfil the objects primarily stated, it is to be understood that it is not intended to confine the invention to the one form of embodiment herein shown and described, as it is susceptible of embodiment in various forms, all coming within the scope of the claims which follow.

What is claimed is:—

1. In a machine of the class described, the combination with an accounting device; of a pivoted gear element for actuating said accounting device; an arm pivoted concentric with said gear element and carrying pivoted thereto a second gear element engaging said first mentioned gear element; a roller on said second gear element; and an arm adapted to be positioned to be engaged by and thereby differentially position said roller and said gear elements with respect to their pivots.

2. In a machine of the class described, the combination with an accounting device; of a pivoted gear element for actuating said accounting device; an arm pivoted concentric with said gear element and carrying pivoted thereto a second gear element engaging said first mentioned gear element; a roller on said second gear element; an arm adapted to be positioned differentially and thereby differentially position said gear elements with respect to their pivots; a latch device carried by said first arm for differentially positioning said second arm; and manipulative means for rendering said latch device inoperative for said purpose at different points of movement of said first arm.

3. In a machine of the class described, the combination with an accounting device; of a driving member therefor having an invariable movement; a pivoted angularly adjustable element for effecting differential rotation of said member; and manipulative means controlling the adjustment of said element.

4. In a machine of the class described, the combination with an accounting device; of an actuator therefor having an invariable movement; a pivoted angularly adjustable element for effecting differential rotation of said actuator, and means for latching said element in adjusted position.

5. In a machine of the class described, the combination with an accounting element, of a bodily movable and rotating element, having connections for driving the accounting device by its movements; a latch permitting but slight rotation of said element; and manipulative means controlling the operation of said latch.

6. In a machine of the class described, the combination with an accounting element; of an operating element therefor mounted on an oscillating arm; a guide for said operating element; and means for differentially adjusting said guide to regulate movement of said operating element relatively of said arm.

7. In a machine of the class described, the combination with a pivoted arm; of a plurality of depressible keys for controlling movement of said arm; means for rocking said arm as controlled by said keys; a device for locking said arm in its adjusted position; and an accounting device actuator controlled in its movement by said adjustable arm.

8. In a machine of the class described, the combination with an accounting device; of a pivoted segment gear for operating said accounting device; an arm pivoted concentric with said segment gear; a segment gear pivoted on said arm and meshing with said first mentioned segment gear; means for rocking said arm; and means for permitting or preventing substantial rotation of said second segment gear and regulating its extent of rotation when said arm is rocked.

9. In a machine of the class described, the combination with an accounting device; of a member having an invariable extent of movement at all operations of the machine; a gear element pivotally mounted on said member; connections for operating said gear element to drive the accounting device during the entire movement of said member and to regulate as desired the operation of the accounting device.

10. In a machine of the class described, the combination with an accounting device; of a member having an invariable extent of movement at all operations of the machine; a gear element mounted on said member; connections for operating said gear element to drive the accounting device during the entire movement of said member, such connections being constructed to rotate said segment gear during movement of said member and thereby regulate as desired the operation of the accounting device; and means for positively restoring said connections to normal position at the end of the operation of the machine.

11. In a machine of the class described, the combination with an accounting device; of a pivoted gear element for actuating said accounting device; an arm pivoted concentric with said gear element; a second gear element pivoted to said arm and engaging said first mentioned gear element; a roller on said second gear element; an arm adapted to be positioned to be engaged by and thereby differentially position said gear elements with respect to their pivots; and means for positively restoring said arm to normal position at the end of the operation of the machine.

12. In a machine of the class described, the combination with a determining member; of manipulative means controlling the differential adjustment of said member; means for locking said member in its adjusted position; a device having an invariable movement at each operation of the machine; and a differentially movable element operated by said device an extent determined by the determining member and while said member is being moved to adjusted position and after said member is locked in adjusted position.

13. In a machine of the class described, the combination with an accounting device; of an actuator therefor; an element for operating said actuator and having two kinds of movements; a member for operating the element; and means for changing the speed of one kind of movement of the said element at different points of its other kind of movement so that it will differentially operate the actuator for the accounting device.

14. In a machine of the class described, the combination with an accounting device; of an actuator therefor; a member for operating the actuator and having two kinds of movements; a determining member for changing the speed of one kind of movement of the first mentioned member throughout the movement of the other kind to regulate the speed and extent of movement of the actuator so that it will differentially operate the accounting device; and manipulative means for controlling the adjustment of said determining member.

15. In a machine of the class described, the combination with an accounting device; of an actuator therefor; a member for operating the actuator and having two kinds of movements; a determining member for changing the speed of one kind of movement of the first mentioned member throughout the movement of the other kind to regulate the speed and extent of movement of the actuator so that it will differentially operate the accounting device; manipulative means for controlling the adjustment of said determining member; and means for latching said determining member in adjusted position.

16. In a machine of the class described, the combination with an accounting device; of an actuator therefor; a determining element for regulating the movement of said actuator; and means for simultaneously differentially setting the determining element and operating the actuator, constructed to operate a constant predetermined duration regardless of the extent of differential movement imparted.

17. In a machine of the class described, the combination with an accounting device; of an actuator therefor; of a determining element for regulating the movement of said actuator; means for simultaneously differentially setting the determining element and operating the actuator constructed to operate a constant predetermined duration regardless of the extent of differential movement imparted; and manipulative means for controlling the differential setting of the determining element.

18. In a machine of the class described, the combination with a pair of pivoted intermeshing segment gears; and means for giving the pivot of one of said segment gears an invariable movement and for simultaneously differentially rotating the same to move the other segment gear differentially during a predetermined operation regardless of the differential movement imparted to the last mentioned segment gear.

19. In a machine of the class described, the combination with a pair of pivoted intermeshing segment gears; of means for giving the pivot of one segment gear an invariable movement and for simultaneously differentially rotating the same with a varying speed to regulate the speed of the differential movement of the other segment gear imparted thereby throughout the invariable movement of the first mentioned segment gear.

20. In a machine of the class described, the combination with an accounting device; of a pivoted segment gear for operating said accounting device; an arm pivoted concentric with said segment gear; means for moving said arm; a second gear pivoted on said arm and meshing with said first mentioned segment gear; adjustable means for rotating said second gear in either direction and regulating its extent of rotation when said arm is moved; and manipulative means for determining the extent of adjustment of said means.

21. In a machine of the class described, the combination with an accounting device; of an arm pivoted concentric with said segment gear; a second segment gear pivoted on said arm and meshing with said first segment gear; means for rocking said arm; adjustable means for rocking said second segment gear upon movement of said arm at varying speeds and in different directions to regulate the speed and extent of movement of said first segment gear; and means carried by said arm for adjusting said adjustable means.

22. In a machine of the class described, the combination with an accounting device; of a pivoted segment gear for operating said accounting device; an arm pivoted concentric with said segment gear; a second segment gear pivoted on said arm and meshing with said first segment gear; means for rocking said arm; adjustable means for rocking said second segment gear upon movement of said arm at varying speeds and in different directions to regulate the speed and extent of movement of said first segment gear; means carried by said arm for adjusting said adjustable means; and manipulative means for determining the extent of adjustment of said adjustable means.

23. In a machine of the class described, the combination with an accounting device; of an operating member therefor having an invariable extent of movement of one kind; and means for simultaneously effecting differental movement of the other kind of said operating member to operate said accounting device.

24. In a machine of the class described, the combination with an accounting device; of an operating member therefor having an invariable movement; and means for effecting differential rotation of the operating member, such rotation being of the same duration as the invariable movement regardless of the extent of differental movement to be imparted to the operating member.

25. In a machine of the class described, the combination with an accounting device; of an actuator therefor; a device for driving said actuator and having two kinds of movement one of which drives said actuator, while the other regulates the extent of movement.

26. In a machine of the class described, the combination with an accounting device; of an actuator therefor; a member for driving said actuator and having two kinds of movement one of which drives said actuator while the other regulates the extent and speed of movement of the same.

27. In a machine of the class described, the combination with an accounting device; of an actuator therefor; a device for driving said actuator and having two kinds of movement one of which drives said actuator while the other regulates the extent of movement; an operating means for imparting one kind of movement; a movable determining member for imparting the other kind of movement; and manipulative means for controlling movement of said determining member.

28. In a machine of the class described, the combination with an accounting device; of an actuator therefor; a member for operating said actuator and having two kinds of movement one of which drives said actuator while the other regulates the extent and speed of movement of the same; an operating mechanism for imparting one kind of movement to said operating member; a determining member for imparting the other kind of movement to said operating member; and manipulative means for controlling said determining member.

29. In a machine of the class described, the combination with an accounting device; of an actuator therefor; a device for operating said actuator and having two kinds of movement one of which drives said actuator while the other regulates the extent of movement; an operating mechanism for imparting one kind of movement to said operating member; a determining member positioned by said operating mechanism for imparting the other kind of movement to said operating member; and manipulative means for controlling the extent of movement of said determining member.

30. In a machine of the class described, the combination with an accounting device; of a pivoted segment gear for operating said accounting device; an arm pivoted concentric with said segment gear; another segment gear pivoted on said arm and meshing with said first mentioned segment gear; and means for rotating said last mentioned segment gear in either direction to regulate its extent of rotation simultaneously with the movement of the arm supporting the same.

31. In a machine of the class described, the combination with an accounting device; of a pivoted segment gear for operating said accounting device; an arm pivoted concentric to said segment gear; a second segment gear pivoted on said arm and meshing with said first segment gear; means for rocking said arm; and means for rocking said second segment gear upon movement of said arm, said means being constructed to rock said latter gear at varying speeds and in different directions to regulate the speed and extent of movement of the first segment gear.

32. In a machine of the class described, the combination with an accounting element; of a member for differentially moving said element and having an invariable movement; and a pivoted angularly adjustable element for effecting differential relation of said member in one or both directions simultaneously with the adjustment of the angularly adjustable member, the extent and direction of rotation of such member being dependent upon the differential movement to be imparted to the accounting element.

33. In a machine of the class described, the combination with an accounting element; of a member for operating the same having an invariable movement; a series of depressible keys; and a pivoted angularly adjustable element controlled by said keys for effecting simultaneously with the adjustment of the latter element differential rotation of said operating member in one or both directions, the extent and direction of rotation being dependent upon the key depressed.

34. In a machine of the class described, the combination with a determining member; of manipulative means for controlling the differential adjustment of said member; a device having an invariable movement at each operation of the machine for positioning said member; and an element operated by said device an extent determined by the extent of movement of the determining member and simultaneously therewith.

35. In an accounting machine, the combination with a determining member having a slot therein; of manipulative means for controlling the differential adjustment of said member; means for locking said member in adjusted position; a differentially movable element; and a device playing in the slot in said determining member and having an invariable movement at each operation of the machine for moving the differentially movable element an extent determined by the determining member, said movement being imparted both before and after said member is locked in adjusted position.

36. In an accounting device, the combination with a differentially movable element; of a device having the same degree of movement at each operation of the machine; and a determining member capable of being moved differentially for deflecting the course of said device simultaneously with its own movement and thereby actuating the movable element differentially.

37. In an accounting machine, the combination with a differentially movable member having an inclined slot formed therein; of a device playing in said slot and having the same degree of movement at each operation of the machine; and a differentially adjustable member for deflecting simultaneously with its own movement the course of said device thereby actuating the movable element differentially.

38. In a machine of the class described, the combination with a differentially movable element; of a device having the same degree of movement at each operation of the machine; a differentially adjustable member for deflecting simultaneously with its own adjustment the course of said device thereby actuating the movable element differentially; and means preventing the overthrow of the differentially adjustable member.

39. In a machine of the class described, the combination with a differentially movable element having an inclined slot formed therein; of a device playing in said slot and having the same degree of movement at each operation of the machine; a differentially adjustable member for deflecting simultaneously with its own adjustment the course of said device thereby actuating the movable element differentially; and means preventing the overthrow of the differentially movable element.

40. In an accounting machine, the combination with a differentially movable member; of a device having the same degree of movement at each operation of the machine and normally in the same course; a differentially adjustable element for deflecting the course of said device thereby actuating the differentially movable member differentially; and manipulative means adapted to obstruct movement of said differentially adjustable element to determine the extent of movement of said movable member and also to prevent overthrow thereof.

41. In a machine of the class described, the combination with a differentially movable element; of an operating device therefor having the same degree of movement at each operation of the machine; and a differentially adjustable member moved by the operating device to its adjusted position and for deflecting part of the operating device from its normal course thereby actuating the differentially movable element simultaneously with the movement of the differentially adjustable member.

42. In a machine of the class described, the combination with a differentially movable element having a slot formed therein; of an operating device therefor playing in said slot and having the same degree of movement at each operation of the machine; and a differentially adjustable member moved by the operating device to its adjusted position and for deflecting part of the operative device from its normal course thereby actuating the differentially movable element simultaneously with the movement of the differentially adjustable member.

43. In a machine of the class described, the combination with an accounting device; of actuators for entering amounts thereon and for turning the same to zero position; means for operating said actuators in an adding operation a predetermined duration regardless of the extent of differential movement imparted, but adapted in a turn to zero operation to operate the actuators a duration dependent upon the amount on the accounting device.

44. In a machine of the class described, the combination with a pair of pivoted intermeshing segment gears; of means for giving the pivot of one of said segment gears an invariable extent of movement and for simultaneously differentially rotating the segment gears; and an accounting device for determining the extent of differential movement of a last mentioned segment gear.

45. In a machine of the class described, the combination with an accounting device; of a pivoted segment gear element constructed to actuate said accounting device; an arm pivoted concentric with said segment gear; a second segment gear element pivoted on said arm and engaging said first mentioned gear element; a roller on said second gear element; and an arm adapted to be positioned to be engaged by said roller and thereby differentially position said segment gears with respect to their pivots, the accounting device being arranged to determine the extent of movement of the last mentioned arm.

46. In a machine of the class described, the combination with an accounting element carrying a projection thereon; of a pivoted gear element for actuating said accounting element; an arm pivoted concentric with said gear element and carrying pivoted thereto a second gear element engaging said first mentioned gear element; a roller on said second gear element; an arm adapted to be positioned differentially and thereby differentially position said gear elements with respect to their pivots; a latch device carried by said first arm for differentially positioning said second arm; and a pivoted member carried by said first arm and operated by said projection on the accounting element to render said latch inoperative at different points of the movement of said first arm.

47. In a machine of the class described, the combination with an accounting element carrying a projection thereon; of a pivoted gear element for actuating said accounting element; an arm pivoted concentric with said gear element and carrying pivoted thereto a second gear element engaging said first mentioned gear element; a roller on said second gear element; an arm adapted to be positioned differentially and thereby differentially position said gear elements with respect to their pivots; a latch device carried by said first arm for differentially positioning said second arm; and means for simultaneously locking said accounting device against movement upon the operation of said latch.

48. In a machine of the class described, the combination with an accounting element; of an actuator therefor having an invariable movement; a pivoted angularly adjustable element for effecting differential rotation of said actuator; a latch for adjusting said angularly adjustable element; and a lever controlled by the accounting element for operating said latch at different points of the invariable movement of the actuator.

49. In a machine of the class described, the combination with an accounting device; of an operating member therefor having an invariable extent of movement of one kind; and means for effecting differential movement of the other kind of said operating member to operate said accounting device said accounting device being constructed to control said means.

50. In a machine of the class described, the combination with an accounting element; of an actuator therefor having an invariable movement; a pivoted angularly adjustable element for effecting differential rotation of said actuator; a latch for adjusting said angularly adjustable element; a lever controlled by the accounting element for operating said latch at different points of the invariable movement of the actuator; and an alining and locking device also controlled by said accounting device for alining and locking said accounting element against further movement upon operation of said latch.

51. In a machine of the class described, the combination with an accounting element; of an actuator therefor having an invariable movement; a pivoted angularly adjustable element for effecting differential rotation of said actuator; a latch for adjusting said angularly adjustable element; a lever controlled by the accounting element for operating said latch at different points of the invariable movement of the actuator; a spring operated alining and locking device also controlled by said accounting device for alining and locking said accounting element against further movement upon operation of said latch; and operating means for positively restoring said latch to latching position and moving said alining device out of alining position.

52. In a machine of the class described, the combination with an accounting device; of a pivoted gear element for actuating said accounting device; an arm pivoted concentric with said gear element and carrying pivoted thereto a second gear element engaging said first mentioned gear element; a roller on said second gear element; an arm adapted to be positioned differentially and thereby differentially position said gear elements with respect to their pivots; a latch and device carried by said first arm for differentially positioning said second arm, said accounting device being constructed to render said latch inoperative for said purpose at different points of movement of said first arm.

53. In a machine of the class described, the combination with an accounting element; of a bodily movable and rotating member having connections for driving said accounting device by its movements; and a latch permitting but slight rotation of said member, said accounting element being arranged to operate said latch at different points of the bodily movement of the member, to cause an increase in the speed of rotation of same member.

54. In a machine of the class described, the combination with an accounting element; of a bodily movable and rotating member having connections for driving the accounting element by its movements; a latch for said connections permitting both bodily and rotary movement of said driving member, said accounting element being arranged to operate said latch at different points of movement of said member to render said member and connections inoperative to drive said accounting device.

55. In a machine of the class described, the combination with an accounting element; of a bodily movable and rotating member having connections for driving the accounting element by its movements; a latch for said connections permitting both bodily and rotary movement of said accounting device, said accounting element being arranged to operate said latch at different points of movement of said member to render said member and connections inoperative to drive said accounting element and permit an increase in speed of rotation of said member.

56. In a machine of the class described, the combination with an accounting element; of a member for operating said element in item entering and turn to zero operations and having an invariable movement; a pivoted angularly adjustable element for effecting differential rotation of said operating member; and manipulative means for controlling the extent of adjustment of said pivoted element in an adding operation, said accounting device being constructed to control the same in a turn to zero operation.

57. In a machine of the class described, the combination with an accounting element; of an actuator therefor a member for operating said actuator in item entering and turn to zero operations; an oscillatory arm carrying said operating member; a guide for said operating member; means for differentially adjusting said guide to regulate the movement of said operating member relatively to said arm; and manipulative means for controlling said last means in an item entering operation, said accounting element being arranged to control said means in a turn to zero operation.

58. In a machine of the class described, the combination with an accounting device; of an actuator adapted to enter items thereon or turn the same to zero; a member having two kinds of movement both of which serve to actuate the actuator; a determining member; manipulative means operable in an item entering operation for controlling the movement of the determining member so that the determining member will change the speed of one kind of movement of the first mentioned member throughout the movement of the other kind to regulate the speed and extent of movement of the actuators said accounting device being so arranged that in turn to zero operations of the machine the determining member is controlled thereby.

59. In a machine of the class described, the combination with an accounting device; of a printing mechanism for recording the items entered on the accounting device and also the totals thereof; and means for operating the accounting device a predetermined duration regardless of the extent of differential movement imparted to it in an item entering operation and for operating the device a variable duration dependent upon the amount of the accounting device in a total taking operation.

60. In a machine of the class described, the combination with an accounting device; of printing mechanism for recording the items entered on the accounting device and also the totals thereof; actuators for the accounting device adapted to actuate the same in item entering and total taking operations; manipulative means operable in an item entering operation; determining means controlled in an item entering operation by the manipulative means, for operating the actuator a predetermined duration regardless of the extent of differential movement imparted to the actuator, said accounting device being so arranged that in total taking operations it controls the determining means to cause the latter to operate the actuator a variable duration dependent upon the amount on the accounting device.

61. In a machine of the class described, the combination with an accounting device; of a printing mechanism for recording the items entered on the accounting device and also the totals thereof; a pair of pivoted intermeshing segment gears one of which serves to actuate the accounting device in both item entering and total taking operations; and means for giving the pivot of the other segment gear an invariable movement and for simultaneously differentially rotating the same to cause the actuating gear to operate the accounting device in both item entering and total taking operations.

62. In a machine of the class described, the combination with an accounting device; of a printing mechanism for recording items entered on the accounting device and also the totals thereof; an actuator for the accounting device adapted to operate the same in item entering and total taking operations; an element for driving said actuator and having two kinds of movement one of which drives said actuator while the other regulates the speed of movement of the actuator; and manipulative means for controlling said driving element in an item entering operation said accounting device being arranged to control the driving device in a total taking operation.

63. In a machine of the class described, the combination with an accounting element; of a printing mechanism for recording the items entered on the accounting device and also the totals thereof; an actuator for the accounting device adapted to drive the same in item entering and total taking operations; a differentially adjustable determining member for controlling the extent of movement of said actuator; means for locking said determining member against movement in an item entering operation before the actuator has imparted thereto its full differential movement; and a total lever for rendering, when operated, said locking means ineffective for such purpose until after the actuator has received its full extent of movement.

64. In a machine of the class described, the combination with an accounting device; of a printing mechanism for recording the items entered on the accounting device and also the totals thereof; an actuator for the accounting device and adapted to drive the same in a total taking operation upon movement from normal position and in an item entering operation upon return movement to normal position; driving means for the actuator; a differentially adjustable determining member for controlling the extent of movement of said actuator; means for locking said determining member against movement in an item entering operation before said driving means has given the actuator its full differential movement; a total lever for rendering ineffective in a total taking operation said locking means until after the actuator has received its full differential movement; and operating means for restoring said total lever to normal position after said actuator has received its full differential movement so that said locking means may become effective whereby the actuator may be restored to normal position to restore on the accounting device the total originally thereon.

65. In a machine of the class described, the combination with an accounting device; of a pivoted gear element for actuating said acounting device to enter an amount thereon or turn the same to zero; an arm pivoted concentric with said gear element and carrying pivoted thereto a second gear element, engaging said first mentioned gear element; a roller on said second gear element; an arm adapted to be positioned to be engaged and thereby differentially position said gear elements with respect to their pivots; a latch device carried by said first arm for differentially positioning said second arm; and manipulative means operable for an item entering operation for rendering said latch device inoperative for such purpose at different points of movement of said first arm, said accounting device being arranged to control said latch device in a turn to zero operation for such purpose.

66. In a machine of the class described, the combination with an accounting device; of differential mechanism therefor; a main operating mechanism; a series of keys for controlling the extent of movement of said differential mechanism; a normally operative zero stop carrying lever for said differential mechanism, said lever being rocked upon operation of a key in the series to move the zero stop into inoperative position, a roller carried by said lever; and a disk provided with grooves for engaging said roller to prevent movement of said lever during an operation of the machine, one of the grooves being constructed to positively restore the lever to normal position at the end of the operation of the machine if the lever has been moved upon the operation of a key in the series.

67. In a machine of the class described, the combination with an accounting device; of differential mechanism therefor; a differentially movable determining member for determining the extent of movement of the differential mechanism, a series of keys controlling the extent of movement of the differentially determining member; a normally operative zero stop lever for the differential mechanism, movable to inoperative position by depression of a key in the series; and cam means for positively restoring the zero stop lever to normal position to positively restore the differentially movable determining member to normal position.

68. In a machine of the class described, the combination with a main operating mechanism; of an accounting device; an actuator therefor; a series of keys; detent means for the keys movable by the keys and carrying an arm; a zero stop lever normally held by said arm in position to prevent operation of said actuator; a roller on said zero stop lever; a guide for said roller preventing movement of the zero stop lever from normal position upon operation of the machine; spring means for moving said lever out of normal operative position when said arm is moved upon operation of the detent means by a key in said series; and another guide for said roller for preventing movement of said zero stop lever during movement of said actuator and positively restoring the zero stop lever to normal position at the end of the operation of the machine.

69. In a machine of the class described, the combination with a main operating mechanism; of an accounting element; an actuator therefor; a series of keys; a differentially movable member for controlling the extent of movement of the actuator, controlled by the keys and moved by the main operating mechanism; a zero stop lever normally preventing movement of the differentially movable member and constructed to be moved to permit movement of the differentially movable member upon operation of a key in the series; and cam means for positively restoring the lever to normal position to restore the differentially movable member to normal position.

70. In a machine of the class described, the combination with a main operating mechanism; of an accounting device; an actuator therefor; a series of keys; a differentially movable member moved by the main operating mechanism as controlled by the keys for controlling the extent of movement of said actuator; a zero stop lever normally preventing movement of the differentially movable member and constructed to be moved to permit movement of the differentially movable member upon operation of a key in the series; and a member for locking the zero lever against movement during an operation of the main operating mechanism when a key is not operated and for locking the zero lever in moved position while the accounting device is being actuated and for positively returning the zero lever to normal position positively to return the differentially movable member to normal position.

71. In a machine of the class described, the combination with an accounting device; of printing mechanism for recording items entered on the accounting device and also the totals thereof; an actuator for operating the accounting device in an item entering operation and also in a total taking operation to turn the accounting to zero and then restore the amount on the totalizer originally standing thereon; a total lever having a normal position and operable in a total taking operation; and operating means for returning the total lever to normal position in a total taking operation after the accounting device has been turned to zero position and before the actuators restore on the accounting device the amount originally thereon.

72. In a machine of the class described, the combination with an operating mechanism; of an accounting element; an actuator therefor; a differentially movable determining member for the actuator; a latch for latching the determining member in its differentially set position; a member actuated by the operating mechanism; a spring between the operating member and the latch; an arm preventing the operation of the latch so that the member actuated by the operating mechanism compresses the spring without movement of the latch; and means operated by the operating mechanism for moving said arm after the determining member is differentially positioned so that the spring will operate said latch to lock the determining member in its adjusted position.

73. In a machine of the class described, the combination with an accounting device; of a printing mechanism for printing the amounts entered on the accounting device and also the totals thereof; differential mechanism for operating the printing mechanism and the accounting device in both item entering and total taking operations; amount keys operable in item entering operations; a detent therefor movable by the keys; a total lever operable in total taking operations; and a member which is rigid with said lever, and which upon movement of said lever passes in the path of movement of said detent and thereby prevents operation of said keys, when said total lever is moved.

74. In a machine of the class described, the combination with a totalizer and actuating devices therefor; of a main operating mechanism including differently timed cams, a sliding bar for engaging and disengaging said totalizer and said actuating devices and carrying a projection; a lever having a cam groove in which said projection normally plays so that movement of said lever slides said bar; manipulative means for adjusting said lever; a roller on said lever; and a disk operated by the operating mechanism and having grooves in which said roller plays in any position of the lever to lock said lever against movement during an operation of the machine.

75. In a machine of the class described, the combination with a totalizer; of actuators therefor; a main operating mechanism including differently timed cams; a sliding bar selectively connected to said cams for engaging and disengaging said totalizer and said actuators and carrying a projection; a pivoted member having a cam groove in which said projection extends so that movement of said member from normal slides said bar; a hand lever for adjusting said member and having a normal position; a roller on said member; a disk operated by the operating mechanism and having grooves in which said roller plays to prevent movement of said lever during movement of the operating mechanism; and means actuated by the operating mechanism for returning said hand lever to normal position before said pivoted member is restored to its normal position.

76. In a machine of the class described, the combination with an accounting device; of a driving member therefor having an invariable movement; a pivoted angularly adjustable element for effecting differential rotation of said member during the invariable movement of the member; and manipulative means controlling the adjustment of said element.

77. In a machine of the class described, the combination with an accounting device; of an actuator therefor having an invariable movement; a pivoted angularly adjustable element for effecting differential rotation of said actuator during the invariable movement of the actuator; and means for latching said element in adjusted position.

78. In a machine of the class described, the combination with an accounting device; of a driving member therefor having an invariable movement; a pivoted angularly adjustable element adjusted during the movement of the driving member for effecting differential rotation of said member during the invariable movement of the latter.

79. In a machine of the class described, the combination with an accounting device; of an actuator therefor having an invariable movement; a pivoted angularly adjustable element adjusted during the invariable movement of the actuator for effecting differential rotation of said actuator during the invariable movement of the latter, and means for latching said element in adjusted position.

80. In a machine of the class described, the combination with an accounting device; of a driving member therefor having an invariable movement; a pivoted angularly adjustable element adjusted during the movement of the driving member for effecting differential rotation of said member, said member being rotated differentially upon each operation during its entire invariable movement.

81. In a machine of the class described, the combination with an accounting device; of an actuator therefor having an invariable movement; a pivoted angularly adjustable element adjusted during the invariable movement of the actuator for effecting differential rotation of said actuator, said actuator being rotated differentially upon each operation during its entire invariable movement, and means for latching said element in adjusted position.

In testimony whereof I affix my signature in the presence of two witnesses.

FREDERICK L. FULLER.

Witnesses:
  R. C. GLASS,
  CARL BENST,

---

It is hereby certified that in Letters Patent No. 1,195,198, granted August 22, 1916, upon the application of Frederick L. Fuller, of Dayton, Ohio, for an improvement in "Differential Mechanism for Accounting-Machines," errors appear in the printed specification requiring correction as follows: Page 11, line 23, and page 13, line 100, for the word "reset" read *read;* page 11, line 24, and page 15, line 44, for the word "read" read *reset;* and that the said Letters Patent should be read with these corrections therein that the same may conform to the record of the case in the Patent Office.

Signed and sealed this 26th day of June A. D., 1917.

[SEAL.]
    R. F. WHITEHEAD,
    *Acting Commissioner of Patents.*

Cl. 235—2.